US012584860B1

(12) United States Patent
Nguyen et al.

(10) Patent No.: US 12,584,860 B1
(45) Date of Patent: Mar. 24, 2026

(54) UNDERCOAT CORROSION MONITORING RAMAN SENSOR

(71) Applicant: TDA Research, Inc, Wheat Ridge, CO (US)

(72) Inventors: Vinh Nguyen, Arvada, CO (US); Ronald Lee Cook, Lakewood, CO (US); Jeannine E. Elliott, Superior, CO (US); Joshua R. Biller, Evergreen, CO (US)

(73) Assignee: TDA Research, Inc., Golden, CO (US)

( * ) Notice: Subject to any disclaimer, the term of this patent is extended or adjusted under 35 U.S.C. 154(b) by 1052 days.

(21) Appl. No.: 17/688,628

(22) Filed: Mar. 7, 2022

Related U.S. Application Data

(60) Provisional application No. 63/157,328, filed on Mar. 5, 2021.

(51) Int. Cl.
$\quad$ *G01N 21/65* $\quad$ (2006.01)
$\quad$ *G01N 21/77* $\quad$ (2006.01)

(52) U.S. Cl.
$\quad$ CPC ........... *G01N 21/658* (2013.01); *G01N 21/77* (2013.01); *G01N 2021/7789* (2013.01)

(58) Field of Classification Search
$\quad$ None
$\quad$ See application file for complete search history.

(56) References Cited

U.S. PATENT DOCUMENTS

| | | | |
|---|---|---|---|
| 8,085,165 B2 | 12/2011 | Wavering et al. | |
| 2003/0093107 A1* | 5/2003 | Parsonage | A61F 2/958 |
| | | | 606/194 |
| 2005/0135546 A1 | 6/2005 | Ponstingl et al. | |
| 2006/0162431 A1 | 7/2006 | Harris et al. | |
| 2011/0210014 A1 | 9/2011 | Garosshen | |
| 2014/0186215 A1* | 7/2014 | Shinta | G01N 21/658 |
| | | | 977/773 |
| 2018/0067054 A1* | 3/2018 | Suresh | G01N 21/658 |

OTHER PUBLICATIONS

Lou, Tingting, et al. "Rapid detection of melamine with 4-mercaptopyridine-modified gold nanoparticles by surface-enhanced Raman scattering." Analytical and bioanalytical chemistry 401 (2011): 333-338. (Year: 2011).*

(Continued)

*Primary Examiner* — Lyle Alexander
(74) *Attorney, Agent, or Firm* — Brian Elliott; Sarah Hill

(57) ABSTRACT

A corrosion detecting composition comprising a nanoparticle and at least one chemically reactive adsorbate associated with the nanoparticle. The chemically reactive adsorbate displays a responsive surface enhanced Raman scattering (SERS) spectral response that is a function of pH. The nanoparticle is contained in a selective carrier; such that the selective carrier allows transport of protons or hydroxide anions to the chemically reactive adsorbate associated with the nanoparticle. Lastly, the selective carrier restricts transport of organic chemical compounds to the at least one chemically reactive adsorbate. This allows the Raman sensor molecules to be blended with paints and coatings prior to application on metal surfaces, and the Raman sensor molecules do not prematurely react with the components of paints or coatings. A Raman detectors can be used to non-destructively interrogate the Raman sensor molecules and detect the pH changes associated with undercoat corrosion.

13 Claims, 32 Drawing Sheets

(56)     References Cited

OTHER PUBLICATIONS

Chiang, Chia-Yen, et al. "Au nanoparticles immobilized on honeycomb-like polymeric films for surface-enhanced Raman scattering (SERS) detection." Polymers 9.3 (2017): 93. (Year: 2017).*
Hong, Yan, et al. "Rapid SERS Detection of Thiol-Containing Natural Products in Culturing Complex." International Journal of Analytical Chemistry 2020.1 (2020): 9271236. (Year: 2020).*

* cited by examiner

| | Gloss | | | Color | | | Tape adhesion | Pencil Hardness | Chemical Resistance |
|---|---|---|---|---|---|---|---|---|---|
| Coating | 20° | 60° | 85° | L | a | b | ASTM 3359B | ASTM 3363 | MEK Double Rub |
| MIL-DTL-53030D (Unmodified) | 0.9 | 2.2 | 2.4 | 81.06 | -0.8 | 9.55 | 5A | 7H | |
| MIL-DTL-53030D (150 ppm sensor) | 0.9 | 1.9 | 2.2 | 80.97 | -0.31 | 9.75 | 5A | 7H | >200 |
| | | | | | | | | | |
| MIL-PRF-23377 (Unmodified) | 2.9 | 23.5 | 57.3 | 56.8 | -8.76 | 15.22 | 2B | 9H | >200 |
| MIL-PRF-23377 (TDA Sensor) | 2.7 | 21.2 | 51.7 | 56.5 | -8.08 | 13.9 | 2B | 9H | >200 |

Fig. 1

| Modifying acid | LogP | %Water Loss |
|---|---|---|
| Trifluoroacetic acid | 1.41 | 4.4 |
| Propionic acid | 1.32 | 7.7 |
| Lactic acid | 0.18 | 11.95 |

UNDERCOAT CORROSION MONITORING RAMAN SENSOR

CROSS REFERENCE TO RELATED APPLICATIONS

The present application claims the benefit of the provisional application No. 63/157,328 filed Mar. 5, 2022 (titled UNDERCOAT CORROSION MONITORING RAMAN SENSOR, by Vinh Nguyen, Ronald Lee Cook, Jeannine E. Elliott, and Joshua R. Biller), which is incorporated by reference herein.

STATEMENT REGARDING FEDERALLY SPONSORED RESEARCH OR DEVELOPMENT

This invention was made using U.S. government funding through the United States Army, SBIR Phase II Contract No. W911W6-15-C-0009. The government has certain rights in this invention.

BACKGROUND OF THE INVENTION

The corrosion of aircraft and vehicles is a significant and ongoing problem. Early stages of corrosion can be undetected due to the primer and/or overcoating blocking visual inspection. Effective monitoring of aircraft structural health is especially important, and early diagnosis of corrosion onset can minimize costs. Undercoat corrosion can damage components before it is detected by coating removal and inspection. One solution is more frequent inspections. However, this approach is costly in both time and materials. Undercoat corrosion monitoring requires a sensor system that is sensitive to the products of corrosion and whose changes following the interaction can be monitored over time. Since many coating systems combine a primer (the coating layer adjacent to the corroding metal where the sensor system must be placed) with a topcoat, the corrosion sensor system must be detectable though both the primer and the topcoat.

Visual detection methods of corrosion include using a pH sensitive chromophore and a color change in the visible spectrum and also through pH (or metal ion) activation of fluorescent sensors. For fluorescence sensing, it is important that the corrosion sensing molecule be incorporated into some kind of carrier, to prevent premature fluorescence. pH sensitive fluorescent probes incorporated into silica nanorods were designed to detect the cathodic (OH⁻ producing) half of the corrosion reaction. For visible color change sensors, a smart coating with pH-triggered release microcapsules is used to visually indicate early-stage corrosion. Current visual-based detection is problematic for use on metal parts covered with pigmented coatings. These approaches can only monitor for corrosion that can be visually inspected (i.e. not an opaque coating) and in the areas in which they are installed, or are sensitive to only one pH range dictated by the indicator.

Corrosion is an electrochemical reaction, and it involves the transfer of electrons between a metal surface and electroactive compounds in solution. During corrosion in aerospace grade aluminum alloys like AA2024 (FIG. 2), the oxidation of the aluminum (anode) produces protons and the reduction of oxygen (in the presence of water) forms hydroxide (cathode). The corrosion of metals is electrochemically driven by the two half-cells:

2

$$\frac{1}{2}O_2 + H_2O + 2e^- \rightarrow 2OH^- \text{ (basic)} \qquad \text{Cathodic:}$$

$$Al \rightarrow Al^{3+} + 3e^- + 3H^+ \text{ (acidic)} \qquad \text{Anodic:}$$

At the anodic half-cell, metals lose electrons and typically form soluble metal complexes with water (or chloride anions if there is salt around) and in addition make the water around the corrosion site more acidic (more H+). Corrosion half-cells are coupled to each other and the electrons from the anodic half-cell are transported through the metal to the cathodic half-cell. The electrons supplied to the cathodic half-cell are used in cathodic reduction reactions. Typically, the cathodic reaction is reduction of oxygen to hydroxide which makes the water surrounding the cathodic half-cell more basic. In more acidic environments the reduction reaction can be reduction of protons to form hydrogen. FIG. 2 shows an illustration of the corrosion cathodic half-cell for materials such as AA2024 and AA7075. There is a brief initial period of corrosion in AA2024 and AA7075 alloys where the intermetallic phase shown in FIG. 2 is anodic with respect to the bulk aluminum. This causes the intermetallic phase to oxidize which releases copper which quickly redeposits on the aluminum to form copper islands with high surface areas. It is oxygen reduction at these copper islands that form the new cathodic half cells and drive the pitting (anodic corrosion) of the bulk aluminum. Thus after the initial corrosion phase the main ongoing corrosion products are aluminum ions, protons, and hydroxide.

The corrosion products of protons and hydroxide ions are not exclusive to corroding aerospace aluminum. The electrochemical reactions for corrosion in steel is depicted in FIG. 3. Dissolution solid iron into $Fe^{2+}$ occurs at the anode, with concomitant production of $H^+$ when $Fe^{2+}$ interacts with nearby water molecules. At the cathode oxygen is reduced to hydroxide anion. The production of $H^+$ and $OH^-$ is fundamental to corrosion in both aerospace grade aluminum and steel alloys which are more routinely deployed in ground-based vehicles.

Sensor materials which react with one or more of these species ($H^+$, $OH^-$) and exhibit a spectroscopic change that can be monitored visually or with an instrument provide the basis of a corrosion sensor, but such sensors and existing methods in the prior art suffer from one or more of the following limitations: they require visual inspection and are inoperable when covered by an opaque coating or they require destructive removal of the top coating.

SUMMARY OF THE INVENTION

The present invention solves the limitations of the prior art by providing an embedded molecular pH change indicator, and a corrosion sensor, that does not rely on visual inspection or visible light interrogation by a detector. In the present invention the pH sensor is interrogated with a portable Raman spectroscopy unit. Many coating systems combine a primer (the coating layer adjacent to the corroding metal where the sensor system must be placed) with a topcoat, the corrosion sensor system must be detectable though the primer and the topcoat. Our undercoat corrosion sensor of the present invention may be used as a drop-in additive to an epoxy primer, and widely dispersed across the metal surface (installed everywhere corrosion may happen). Because of this, the present sensor can track corrosion as it proceeds spatially, underneath the coating. Because the sensor can be read by a portable Raman spectrometer, the sensor allows the user to follow corrosion in the actual environment of use.

The present invention teaches the ratio of the intensities of pH sensitive peaks in the Raman spectrum is "bi-modal"—that is it can reflect with a numerical ratio the acidic pH and basic pH (FIG. 5) values. The numerical ratio can be calibrated such that it reports out on a real pH value. The pH value, especially the acidic pH values, have been correlated with different corrosion states in the primary literature. This characteristic means the Raman sensor is capable of tracking real time changes in the corrosion rate (i.e., the rate of production of protons or hydroxides is proportional to the corrosion current) under any primer system—be that in the laboratory or out in the field. That this sensor tracks corrosion rate easily and reliably under both conditions means it could be used to calibrate how accelerated corrosion methods in the lab will actually translate to real world scenarios.

In an embodiment the present invention provides a corrosion detecting composition: comprising, a nanoparticle and at least one chemically reactive adsorbate associated with the nanoparticle; wherein the chemically reactive adsorbate displays a responsive surface enhanced Raman scattering (SERS) spectral response that is a function of pH; wherein the nanoparticle is contained in a selective carrier; wherein the selective carrier allows transport of protons or hydroxide anions to the at least one chemically reactive adsorbate associated with the nanoparticle; and, wherein the selective carrier restricts transport of organic chemical compounds to the at least one chemically reactive adsorbate.

Optionally, the selective carrier prevents chemical reactions between the chemically reactive adsorbate and organic chemical compounds which contact the selective carrier. In a preferred embodiment the nanoparticle comprises a coinage metal selected from the group consisting of gold, silver and copper and in another optional embodiment the at least one chemically reactive adsorbate has a coinage metal attachment function group and a pH sensitive function group. At least one chemically reactive adsorbate may be selected from the group consisting of 4-mercapto pyridine, 5-methylthio-1,3,4-thiadiazole-2-thiol, mercaptobenzimidazole, 2,5-dimercapto-1,3,4-thiadiazole and 6-mercaptopyridine-3-carboxylic acid, and preferably the at least one chemically reactive adsorbate is of 4-mercapto pyridine. The pH sensing at the 4-mercaptopyridine can happen either at the nitrogen or the sulfur group, with the other group being bound to the nanoparticle surface.

In an embodiment, the selective carrier restricts transport of organic chemical compounds, which are electrophiles, to the at least one chemically reactive adsorbate, optionally the electrophiles are either epoxide monomers, epoxy resins, acrylate monomers, acrylate resins, methacrylate monomers, methacrylate resins, acrylamides, polyurethane monomers, polyurethane resins, polysiloxane monomers, and polysiloxane resins.

The electrophiles may be epoxide monomers or epoxy resins and not acrylate monomers, acrylate resins, methacrylate monomers, methacrylate resins, acrylamides, polyurethane monomers, polyurethane resins, polysiloxane monomers, and polysiloxane resins. The electrophiles may be acrylate monomers, acrylamides, acrylate resins, methacrylate monomers, methacrylate resins and not epoxide monomers, epoxy resins, polyurethane monomers, polyurethane resins, polysiloxane monomers, and polysiloxane resins. The electrophiles may be polyurethane monomers, polyurethane resins and not acrylate monomers, acrylate resins, methacrylate monomers, methacrylate resins, acrylamides, polysiloxane monomers, polysiloxane resins, epoxide monomers or epoxy resins. The electrophiles may be polysiloxane monomers, polysiloxane resins and not acrylate monomers, acrylate resins, methacrylate monomers, methacrylate resins, acrylamides, epoxide monomers epoxy resins, polyurethane monomers, or polyurethane resins.

In an embodiment the at least one chemically reactive adsorbate is a protonatable organic compound, optionally the at least one chemically reactive adsorbate comprises a protonatable organic functional group that displays a responsive surface enhanced Raman scattering (SERS) spectral response that is a function of pH over the range from pH 4 to pH 7.

In an embodiment the at least one chemically reactive adsorbate contains a coinage metal attachment functional group which is a thiol.

In another embodiment the protonatable organic functional group is selected from the group consisting of pyridine, carboxylate, amine, and aromatic amine.

In an embodiment, a mixture comprises a latent reactive epoxy monomer or a latent reactive epoxy resin; wherein a carrier is dispersed in the latent reactive epoxy monomer or a latent reactive epoxy resin; and wherein the carrier prevents chemical reactions between the latent reactive epoxide monomer or latent reactive epoxide resin and a chemically reactive adsorbate. Optionally, the selective carrier is a mesostructured composition comprising boehmite or pseudoboehmite nanoplatelets and organic pillars, wherein the mesostructured composition exhibits at least one low angle x-ray diffraction line corresponding to a lattice spacing of at least 20 Å, wherein the mesostructured composition is formed by reaction of a first surface modified boehmite or pseudoboehmite nanoplatelet composition with a second surface modified boehmite or pseudoboehmite nanoplatelet composition. This first surface may be modified boehmite or pseudoboehmite nanoplatelet is surface-modified with a p-carboxy-aromatic-maleimide and the second surface modified boehmite or pseudoboehmite nanoplatelet is surface-modified with α-carboxy-Q-thiol and the two are mixed together in water at a pH exceeding 5 to form the organically pillared mesostructured composition.

A embodiment is a corrosion detecting composition: comprising, a nanoparticles, wherein the nanoparticle comprises a coinage metal selected from the group consisting of gold, silver and copper; at least one adsorbate associated with the nanoparticle; wherein the adsorbate displays a responsive surface enhanced Raman scattering (SERS) spectral response that is a function of pH; and a carrier, wherein the nanoparticle is supported on the carrier. Optionally, the composition is a corrosion detecting composition: comprising, a nanoparticles, wherein the nanoparticle comprises a coinage metal selected from the group consisting of gold, silver and copper; at least one adsorbate associated with the nanoparticle; wherein the adsorbate displays a responsive surface enhanced Raman scattering (SERS) spectral response that is a function of pH. In either embodiment, the at least one chemically reactive adsorbate may have a coinage metal attachment function group and a pH sensitive function group. Preferably, the at least one adsorbate is selected from the group consisting of 4-mercapto pyridine, 5-methylthio-1,3,4-thiadiazole-2-thiol, mercaptobenzimidazole, 2,5-dimercapto-1,3,4-thiadiazole and 6-mercaptopyridine-3-carboxylic acid. Optionally, the at least one adsorbate comprises a protonatable organic functional group that displays a responsive surface enhanced Raman scattering (SERS) spectral response that is a function of pH over the range from pH 4 to pH 12, and this at least one chemically reactive adsorbate may contain a coinage metal attachment functional group which is a thiol. The protonatable organic functional group is selected from the group consisting of pyridine, carboxylate, amine, and aromatic amine.

The composition may further comprise a latent reactive epoxy monomer or a latent reactive epoxy resin; wherein the carrier, or alternatively wherein the nanoparticle, is dispersed in the latent reactive epoxy monomer or a latent reactive epoxy resin.

The carrier may be a mesostructured composition comprising boehmite or pseudoboehmite nanoplatelets and organic pillars, wherein the mesostructured composition exhibits at least one low angle x-ray diffraction line corresponding to a lattice spacing of at least 20 Å, wherein the mesostructured composition is formed by reaction of a first surface modified boehmite or pseudoboehmite nanoplatelet composition with a second surface modified boehmite or pseudoboehmite nanoplatelet composition. The composition may further comprise wherein the first surface modified boehmite or pseudoboehmite nanoplatelet is surface-modified with a p-carboxy-aromatic-maleimide and the second surface modified boehmite or pseudoboehmite nanoplatelet is surface-modified with α-carboxy-Ω-thiol and the two may be mixed together in water at a pH exceeding 5 to form the organically pillared mesostructured composition.

Another embodiment is an undercoat corrosion detector system, comprising: a corrosion detecting composition, comprising: a nanoparticle and at least one chemical adsorbate associated with the nanoparticle; wherein the chemical adsorbate displays a responsive surface enhanced Raman scattering (SERS) spectral response that is a function of pH; wherein the nanoparticle is contained in a carrier; wherein the carrier is embedded in a primer coating on a metal surface; wherein the chemical adsorbate has a first infrared electromagnetic adsorption band and a second infrared electromagnetic adsorption band, wherein, in response to a pH change, the first infrared electromagnetic adsorption band changes relative to the second infrared electromagnetic adsorption band; a Raman spectrometer in electromagnetic communication with the corrosion detecting composition, wherein the Raman detector independently detects each the first infrared electromagnetic adsorption band and the second infrared electromagnetic adsorption band; and wherein the undercoat corrosion detector detects corrosion under the primer coating based on the electromagnetic energy adsorbed within the first infrared electromagnetic adsorption band relative to the electromagnetic energy adsorbed second infrared adsorption band.

Optionally, the undercoat corrosion detector systems further comprises: wherein the undercoat corrosion detector detects corrosion under the primer coating using an algorithm that comprises the ratio of the electromagnetic light energy adsorbed within the first infrared electromagnetic adsorption band relative to the electromagnetic energy adsorbed second infrared adsorption band. The detector may have a spatial resolution for corrosion detection of at least 50 mm.

Another embodiment is a method for detecting undercoat corrosion, comprising: providing the undercoat corrosion detection system above, using the Raman spectrometer to remotely detect each the first infrared electromagnetic adsorption band and the second infrared electromagnetic adsorption band; and comparing the electromagnetic energy adsorbed within the first infrared electromagnetic adsorption band relative to the electromagnetic energy adsorbed second infrared adsorption band. Further, the method may operate the "comparing" by using an algorithm that comprises the ratio of the electromagnetic light energy adsorbed within the first infrared electromagnetic adsorption band relative to the electromagnetic energy adsorbed second infrared adsorption band.

An embodiment of the invention is an undercoat corrosion detector system, comprising: a corrosion detecting composition, comprising: a nanoparticle and at least one chemical adsorbate associated with the nanoparticle; wherein the chemical adsorbate displays a responsive surface enhanced Raman scattering (SERS) spectral response that is a function of pH; wherein the nanoparticle is contained in a carrier; wherein the carrier is embedded in a primer coating on a metal surface; wherein the chemical adsorbate has a first infrared electromagnetic adsorption band and a second infrared electromagnetic adsorption band, wherein, in response to a pH change, the first infrared electromagnetic adsorption band changes relative to the second infrared electromagnetic adsorption band; a Raman spectrometer in electromagnetic communication with the corrosion detecting composition, wherein the Raman detector independently detects each the first infrared electromagnetic adsorption band and the second infrared electromagnetic adsorption band; and wherein the undercoat corrosion detector detects corrosion under the primer coating based on the electromagnetic energy adsorbed within the first infrared electromagnetic adsorption band relative to the electromagnetic energy adsorbed second infrared adsorption band.

Optionally, the above undercoat corrosion detector system is further defined, wherein the undercoat corrosion detector detects corrosion under the primer coating using an algorithm that comprises the ratio of the electromagnetic light energy adsorbed within the first infrared electromagnetic adsorption band relative to the electromagnetic energy adsorbed second infrared adsorption band. Optionally, the detector has a spatial resolution for corrosion detection of at least 50 mm.

Another embodiment is a method for detecting undercoat corrosion, comprising: providing an undercoat corrosion detection system (An embodiment of the invention is an undercoat corrosion detector system, comprising: a corrosion detecting composition, comprising: a nanoparticle and at least one chemical adsorbate associated with the nanoparticle; wherein the chemical adsorbate displays a responsive surface enhanced Raman scattering (SERS) spectral response that is a function of pH; wherein the nanoparticle is contained in a carrier; wherein the carrier is embedded in a primer coating on a metal surface; wherein the chemical adsorbate has a first infrared electromagnetic adsorption band and a second infrared electromagnetic adsorption band, wherein, in response to a pH change, the first infrared electromagnetic adsorption band changes relative to the second infrared electromagnetic adsorption band; a Raman spectrometer in electromagnetic communication with the corrosion detecting composition, wherein the Raman detector independently detects each the first infrared electromagnetic adsorption band and the second infrared electromagnetic adsorption band; and wherein the undercoat corrosion detector detects corrosion under the primer coating based on the electromagnetic energy adsorbed within the first infrared electromagnetic adsorption band relative to the electromagnetic energy adsorbed second infrared adsorption band), using the Raman spectrometer to remotely detect each the first infrared electromagnetic adsorption band and the second infrared electromagnetic adsorption band; and comparing the electromagnetic energy adsorbed within the first infrared electromagnetic adsorption band relative to the electromagnetic energy adsorbed second infrared adsorption band. Optionally, the comparing comprises using an algorithm that comprises the ratio of the electromagnetic light energy adsorbed within the first infrared electromagnetic adsorption band relative to the electromagnetic energy adsorbed second infrared adsorption band. The term relative may mean a ratio, the product or the arithmetic difference, and the like.

BRIEF DESCRIPTION OF THE DRAWINGS

FIG. 1. (Table 1.) Addition of TDA corrosion sensor does not change the physical characteristics of the primer.

FIG. 29. Comparison of water loss and Log P values calculated from ethyl esters of the acids.

DETAILED DESCRIPTION OF THE INVENTION

Figure 3:
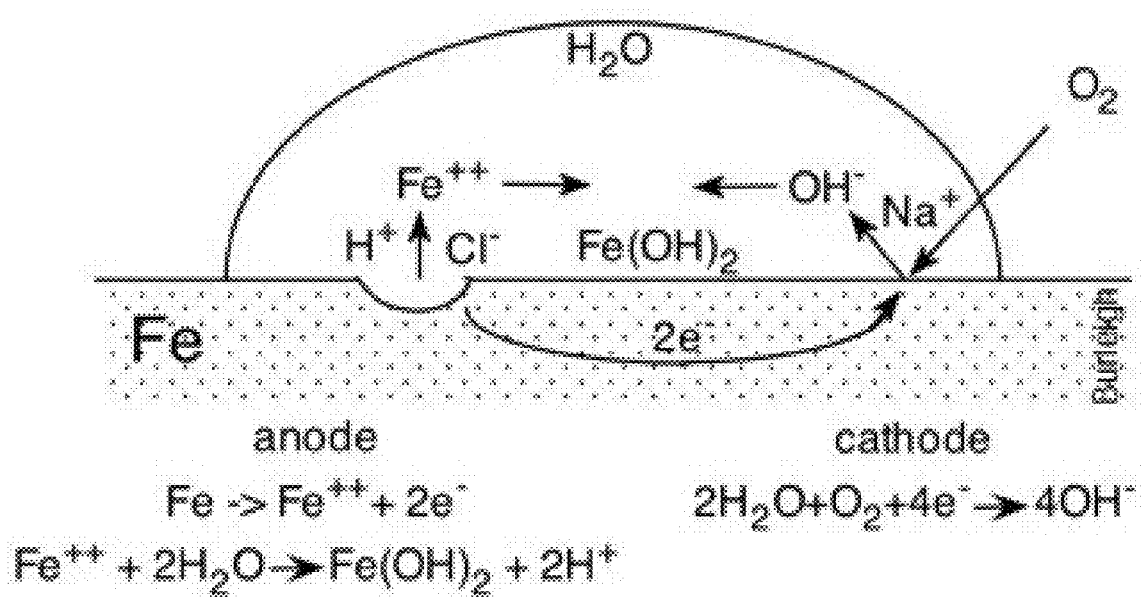
FIG. 3. Schematic of corrosion in steel.

The developed sensor broadly consists of three domains which allow it function as a drop-in additive to existing commercial and military primers and report on corrosion undercoat (FIG. 3). The first domain is an organic molecule with a corresponding Raman spectrum which is sensitive to protonation/deprotonation at the molecule. This domain provides the readout on corrosion induced pH changes. The second domain is a nanoparticle derived from coinage metals. This domain allows us to use Surfaced Enhanced Raman Scattering (SERS) to increase the change in Raman signal from Domain 1 by nearly 1 million-fold, which means only very small amounts (a non-limiting example is 0.5 wt %) of the additive are required for the primer to have undercoat corrosion sensing capabilities. The amount of additive may be from 0.001% up to 5 wt %, it may be 0.01, 0.02. 0.03, 0.04, 0.05, 0.06, 0.07. 0.08, 0.09, 0.1, 0.125, 0.15, 0.175, 0.2, 0.25, 0.3, 0.35, 0.4, 0.45, 0.5, 0.55, 0.56, 0.6, 0.65, 0.7, 0.75, 0.8, 0.9. 1.0, 1.25. 1.5, 1.75, 2.0, 2.5, 3.0, 3.5, 4.0, 4.5, or 5.0 (all expressed as wt %). The range may be from a low of any of the previous amounts up to a high of any of the previous amounts (provide the high amount is higher than the low amount). In other embodiments the amount of additive may some but not all of the amounts, for example it may be (not) any of the following amounts: 0.01, 0.02. 0.03, 0.04, 0.05, 0.06, 0.07. 0.08, 0.09, 0.1, 0.125, 0.15, 0.175, 0.2, 0.25, 0.3, 0.35, 0.4, 0.45, 0.5, 0.55, 0.56, 0.6, 0.65, 0.7, 0.75, 0.8, 0.9. 1.0, 1.25. 1.5, 1.75, 2.0, 2.5, 3.0, 3.5, 4.0, 4.5, or 5.0 (all wt %). The third domain is a carrier, a non-limiting example is an inorganic, alumina-based carrier. The carrier may be any one of alumina, silica, titania, or any inorganic oxide, or mixtures thereof. In certain embodiments the list of carriers for certain additives may exclude any of the following: of alumina, silica, titania, or any inorganic oxide. The same functional groups of domain 1 which are sensitive to pH changes from corrosion in certain embodiments may also interfere with primer cure. Optionally, the third domain separates the sensor from the primer polymers, so that primer cure proceeds unimpeded, and the sensor is ready to report on pH changes. The dimensions of the porous alumina carrier are sufficiently large to allow very small $H^+$ and $OH^-$ ions to quickly pass through and into contact with Domain 1. In other embodiments, the carrier acts as a means to disperse the nanoparticles more evenly in the primer. In ever further embodiments, the third domain is not present or needed and the nanoparticles with additives are added to the primer coating without any carrier. Other additive and adjuvants may be present that do not participate in the Raman measurements.

If present, the carrier material (Domain 3) is optionally a porous alumina scaffold which contains the pH sensor (4-mercaptopyridine, MP, Domain 1) supported on Raman enhancing nanoparticles such as gold or silver (SERS unit, Domain 2). Protons generated during corrosion quickly migrate from the surface of the metal through the primer and into the carrier containing the SERS enhanced MP pH sensor. Attachment of MP to silver or gold has not been demonstrated in a primer system before our work. For MP-Ag in solution the region of 1550-1650 $cm^{-1}$ is sensitive to protonation of the nitrogen in the pyridine ring with a single peak at ~1610 $cm^{-1}$ for pH<1, and a single peak at 1580 $cm^{-1}$ when pH=12. The ratio of the peak at 1580 $cm^{-1}$/1610 $cm^{-1}$ reflects pH from pH<1 (R=0.02) up to pH=12 (R=9.1). For a MP-Au nanoparticle, a transition region is between pH=2.8-5.7, with equal amounts of deprotonated/protonated species at 3.9±0.2. When gold is the SERS unit attached to MP, the ratio span is much narrower, for pH=3 (R=0.94) and pH=9.4 (R=1.14). Our own three-point calibration of MP-Au (FIG. 5) show a 1580/1610 $cm^{-1}$ ratio of R=1.68 (pH=4) to R=2.85 (pH=12).

In the specification and the claims the following terms are given their plain meaning and further defined as follows:

The term "nanocubes" mean a cube structure which is nanosized. Nanosized refers to particles with a diameter size range between 1 and 100 nm.

The term "nanoparticle" means a general term for a wide variety of particle shapes whose dimensions are between 1 and 100 nm.

The term "chemically reactive adsorbate" means a molecule which can adsorb to the surface of a metal on one side of the molecule, and retain a chemical functionality or reactivity at a different site on the molecule.

The term "responsive surface enhanced Raman scattering (SERS) spectral response" means the change in the Raman spectrum for a molecule due to a change in the molecule's environment. The spectral response is amplified by the molecule being adsorbed to a nanoparticle composed of coinage metals. When a laser strikes the surface of the coinage metal particle, a plasmon resonance is created which amplifies the Raman signal of an attached molecule. The recognized name for the plasmon resonance enhanced signal is surfaced-enhanced-Raman-scattering (SERS)

The term "selective carrier" means an inorganic structure which contains the corrosion sensor (nanoparticle plus sensing molecule) and allows transport of protons or hydroxide ions while restricting the transport of larger organic molecules from the coating into the space around the nanoparticle and sensing molecule.

The term "restricts transport of chemical compounds" means prevention of the interaction of organic chemical compounds with the nanoparticle and sensing molecule. The purpose of the restriction is to prevent organic molecules from interfering with the measurement of the proton and hydroxide ions.

The term "chemical reactions" means a process that involves rearrangement of the molecular or ionic structure of a substance, as opposed to a change in physical form or a nuclear reaction.

The term "coinage metal" means those metallic chemical elements which have historically been use as components in alloys used to mint coins. More specifically, a group of three malleable ductile transition metals forming group 11 of the periodic table: copper (Cu), silver (ag), and gold (Au). The coinage metals have high ionization energies and positive standard electrode potentials. This makes the coinage metals more difficult to oxidize and more resistant to corrosion.

The term "electrophiles" means an atom or molecule involved in a chemical reaction that seeks a partner with an electron pair available for bonding.

The term "protonatable organic compound" means an organic compound with some feature or functional group which can receive a proton from an acidic environment.

The term "latent reactive epoxy monomer" means an epoxy monomer where the curing of the monomer is not instantaneous and can occur at a later time with the appropriate stimulus.

The term "latent reactive epoxy resin" means an epoxy resin where the curing of the resin is not instantaneous and can occur at a later time with the appropriate stimulus.

The term "mesostructured composition" means a composition with a structure or superstructure of intermediate size or complexity. Depicting a size scale in the middle of a larger and smaller scale structures.

The term "pH sensitive functional group" means a section of an organic molecule which responds to the changes of pH in the immediate environment by varying the molecules' electronic structure through protonation or deprotonation. Some examples include amines, sulfides and carboxylic acids.

The term "undercoat corrosion detection system" means a method of observing corrosion while the coating is still attached to the surface being monitored. Other corrosion monitoring methods require the coating to be removed from the surface and inspected visually. The corrosion detection system described here monitors corrosion happening at the interface of the coating and surface, or "under coat".

The term "electromagnetic communication" means a laser output from the Raman spectrometer and incident on the surface being analyzed which contains the corrosion sensor. The incident electromagnetic radiation is reflected from the panel surface and returns to the Raman instrument detector, carrying with it the information of electromagnetic absorption of the sensing molecule.

The term "undercoat corrosion detector" means the Raman spectrometer required collect the signal of the Raman sensor in the coating which is giving information on corrosion state. The spectrometer can be any number of commercially available Raman spectrometers, or non-commercial Raman spectrometers built by individuals. If samples were small enough, even benchtop Raman instruments could be used to record the corrosion signal from small test coupons. In-field Raman spectrometers used to make the measurement can be designed from the ground up for stand-off Raman detection (i.e. the Alakai PRIED, the Pendar X10), or use a fiber optic cable which is held up to the surface under inspection (HORIBA, Thermofisher, Wasatch Photonics). The only requirement for the undercoat corrosion detector is that it can analyze flat surfaces or curved surfaces and doesn't require a sample be scraped off and inserted into a tube for analysis.

Two aspects of the Raman sensor are important for corrosion detection. The first is raw signal intensity. The highest raw signal amplitude—corresponding to the highest SERS enhancement—makes it easier to analyze the corrosion state with the Raman spectrometer. The second is the sensitivity of the change in Raman spectrum to different pH values. We extract the slope from a plot of Raman ratio vs. pH from pH 2 to pH 7 and call this the "Raman Response Slope", the RRS. A larger value of RRS means there is a larger range of values between the ratio calculated from the Raman spectrum for pH=2 and that for pH=7.

For gold nanoparticles, there is an optimum between 111 nm and 169 nm for the RRS. However, the raw signal intensity increases as particle size decreases. We have collected data for nano-spherical gold particles from 185 to 89 nm. We have created one other geometry, nanocubes. In the nanocubes, the presence of edges and vertices further enhances the raw signal intensity of the SERS enhancement.

A teaching of the present invention is that the preferred size of nanoparticles is different for different coinage metals and also a function of the geometric shape of the nanoparticles. For gold spherical nanoparticles there is a preferred range from about 169 to 111 nm, optionally from greater than 89 nm to less than 185 nm. The Raman response slope is highest for the preferred size range. For nanocubes, the Raman response may be based on a 36 nm nanoparticles. See FIG. 30.

In contrast, the present invention teaches that the Raman response for silver is unique from, and not predicted by, the response observed from gold nanoparticles. The Raman Response Slope (RRS) is inherently larger for silver than for gold nanoparticles. The primary optimization is nanoparticle size. The normalized signal intensity (after background correction) increases linearly with nanoparticle size. In the current embodiment, we use silver nanoparticles which are around ≤60 nm in size. The restriction is based on the pore size of the boehmite carrier. Applications which tolerated carriers with larger pore sizes would allow even larger silver nanoparticles, with even greater corresponding signal intensity, to be used.

Figure 2:
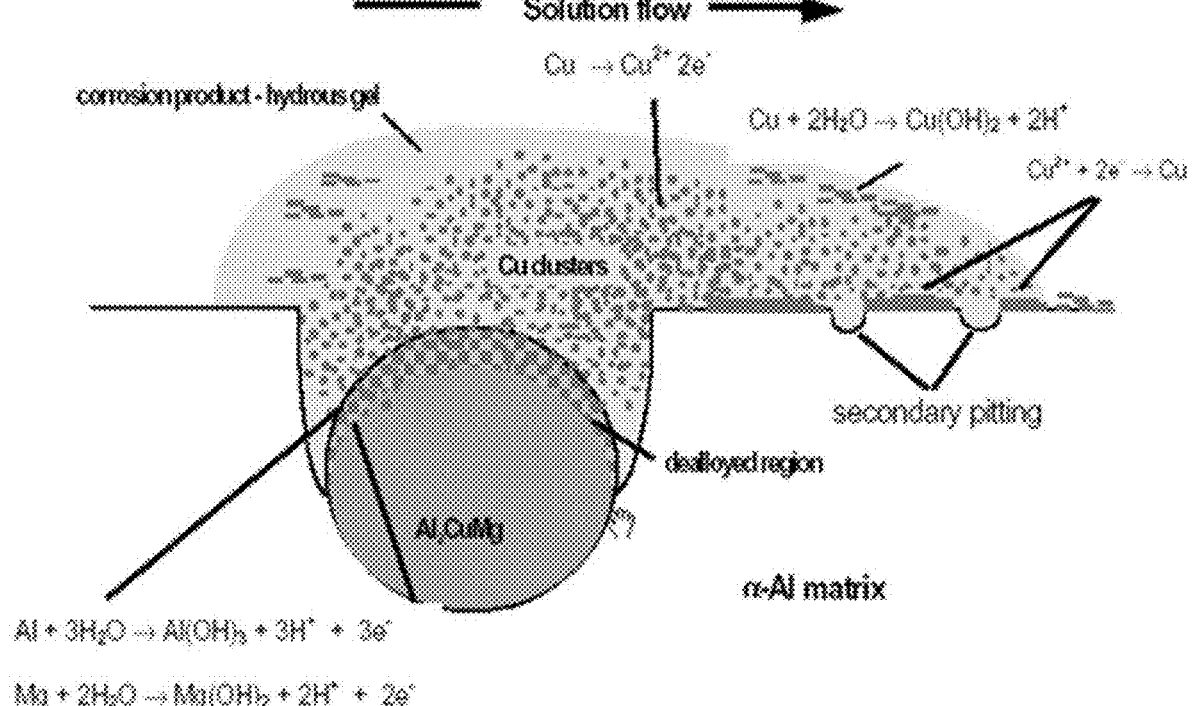
FIG. 2. Schematic of corrosion for Al—Cu alloys (Buchheit 2001).
Figure 4:
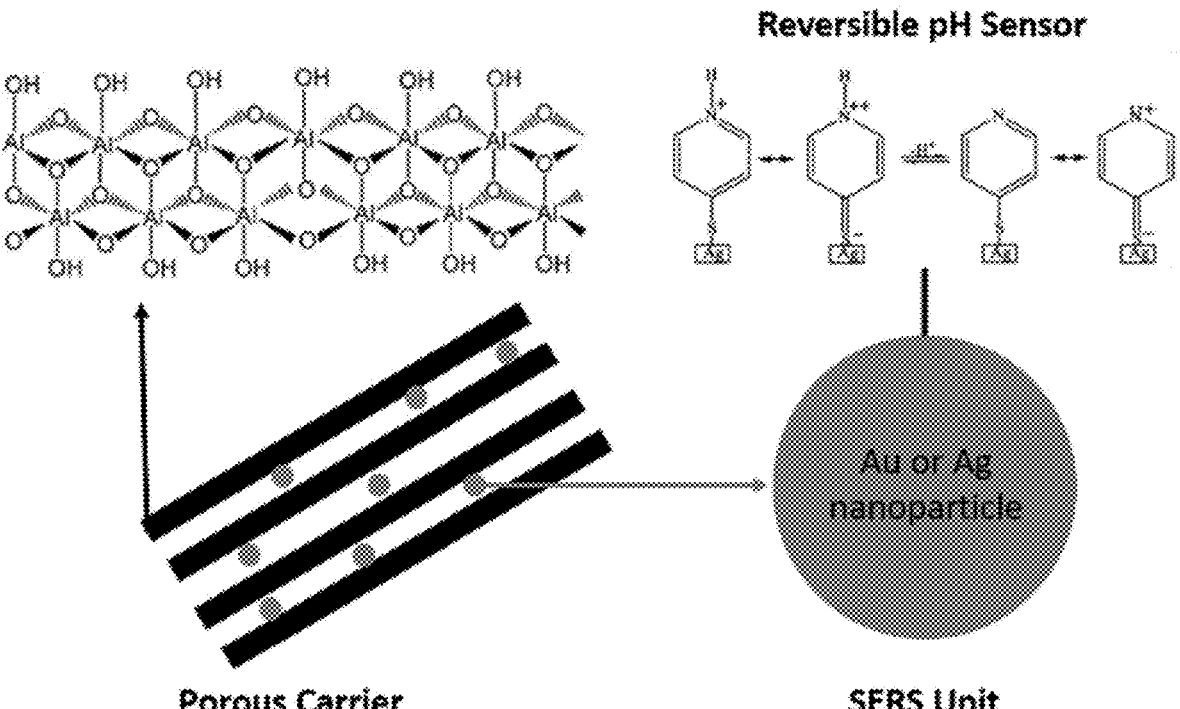
FIG. 4. Schematic of the Raman sensor with carrier, SERS unit and reversible pH indicating sensor.

Further descriptions, aspects and embodiments are illustrated in the accompanying figures. FIG. 1 Shows the addition of the corrosion sensor does not change the physical characteristics of the primer. FIG. 2 Shows a schematic of corrosion for Al—Cu alloys. FIG. 3 Shows a schematic of corrosion in steel. FIG. 4 Shows a schematic of the Raman sensor with carrier, SERS unit and reversible pH indicating sensor.

Figure 5:
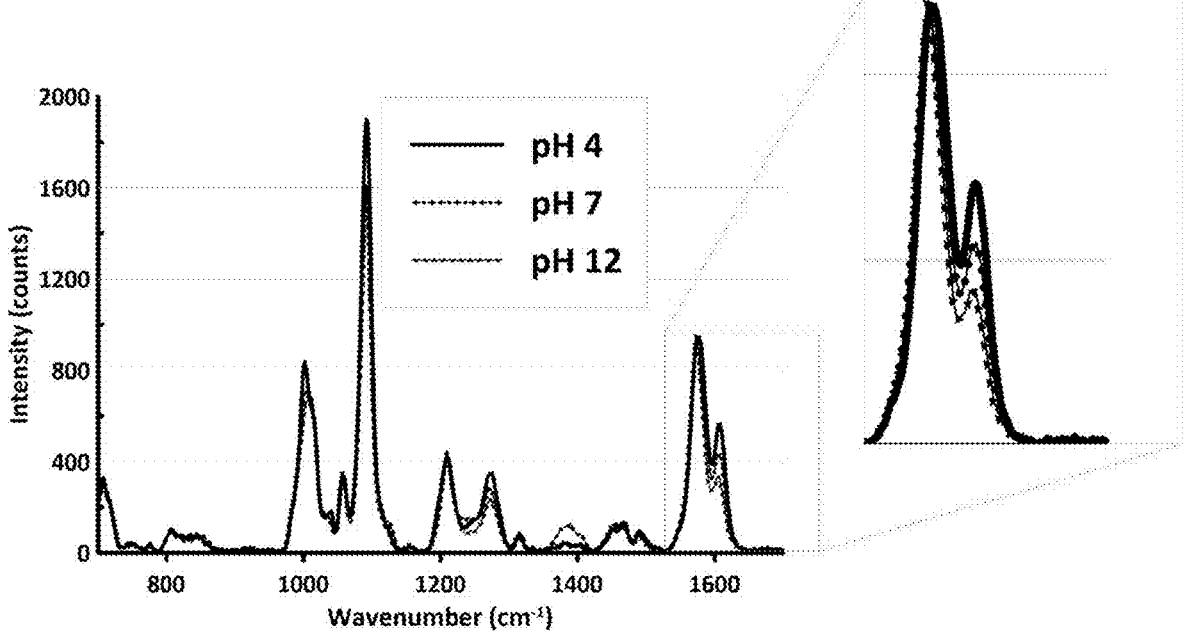
FIG. 5. The change in the Raman spectrum of the sensor in response to solution pH.

FIG. 5 shows the change in the Raman spectrum of the sensor in response to solution pH. The ratio increases at basic pH, and decreases at acidic pH. Raman ratios are R=2.85 (pH 12), R=2.10 (pH 7), R=1.68 (pH=4).

Figure 6:
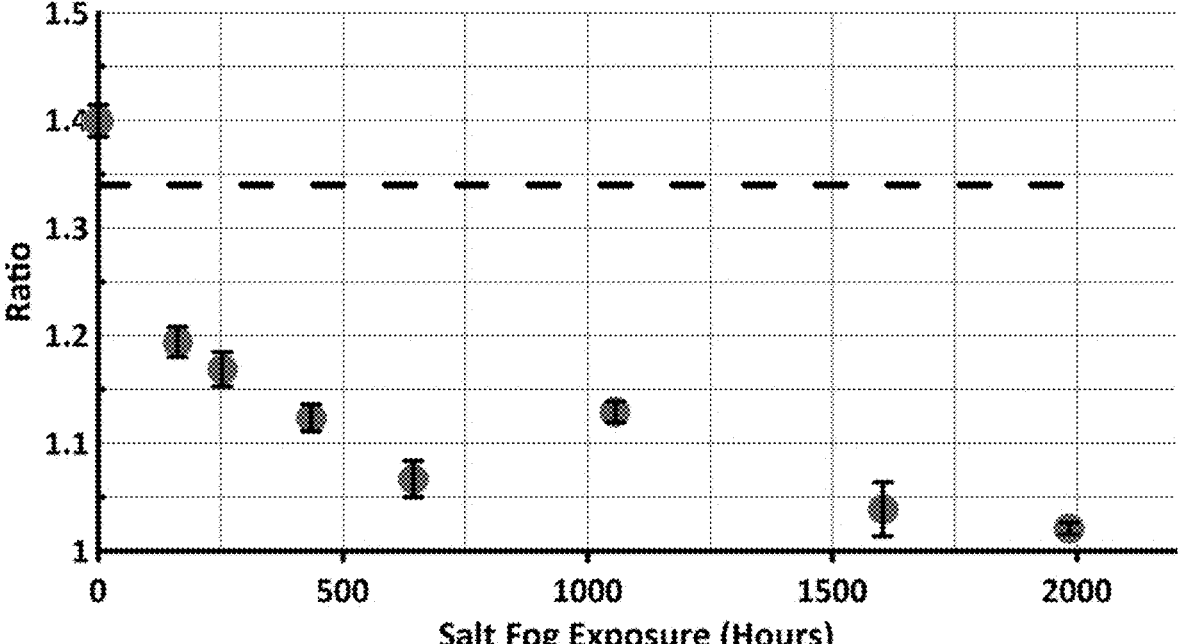
FIG. 6. The ratio of the of peaks near 1580 cm-1 and 1610 cm-1 for a 3"×3" panel with Alodine® 1200 surface pre-treatment, coated with 1 mil primer 53030D.

FIG. 6 shows the ratio of the of peaks near 1580 cm-1 and 1610 cm-1 for a 3"×3" panel coated with 1 mil primer 53030D. This panel was surface treated with chromium containing Alodine® 1200. The sensor activated even when the visual inspection indicated localized, deep damage. A dashed line indicates the level of Raman sensor for a panel not exposed to ASTM 117 accelerated corrosion.

Figure 7:
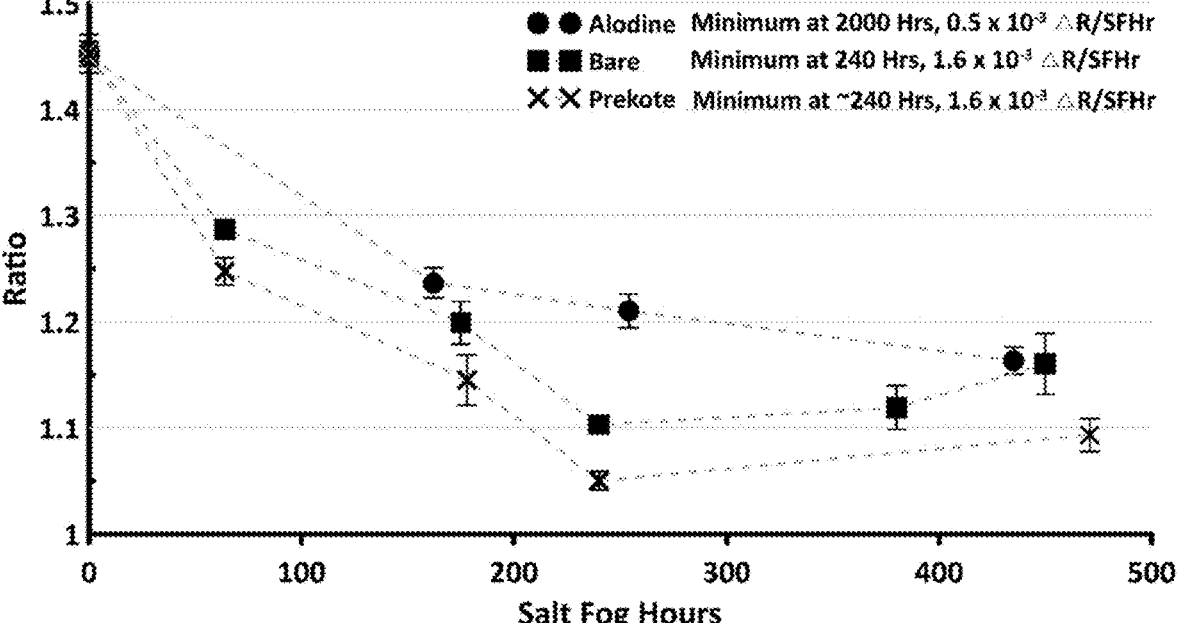
FIG. 7. The rate at which the corrosion sensor ratio drops correlates with the rate of corrosion determined by panel conditions for 3"×3" panels with different coatings and pre-treatments.

FIG. 7 shows the rate at which the corrosion sensor ratio drops correlates with the rate of corrosion determined by panel conditions for 3"×3" panels. Panels with no or minimal surface treatment (Bare, Prekote©) corrode much faster than a panel with Alodine® 1200 (chromium) pre-treatment. This is reflected in the faster drop in Raman ratio for Bare/Prekote© by approximately 3× compared to the Alodine® treated panel.

Figure 8:
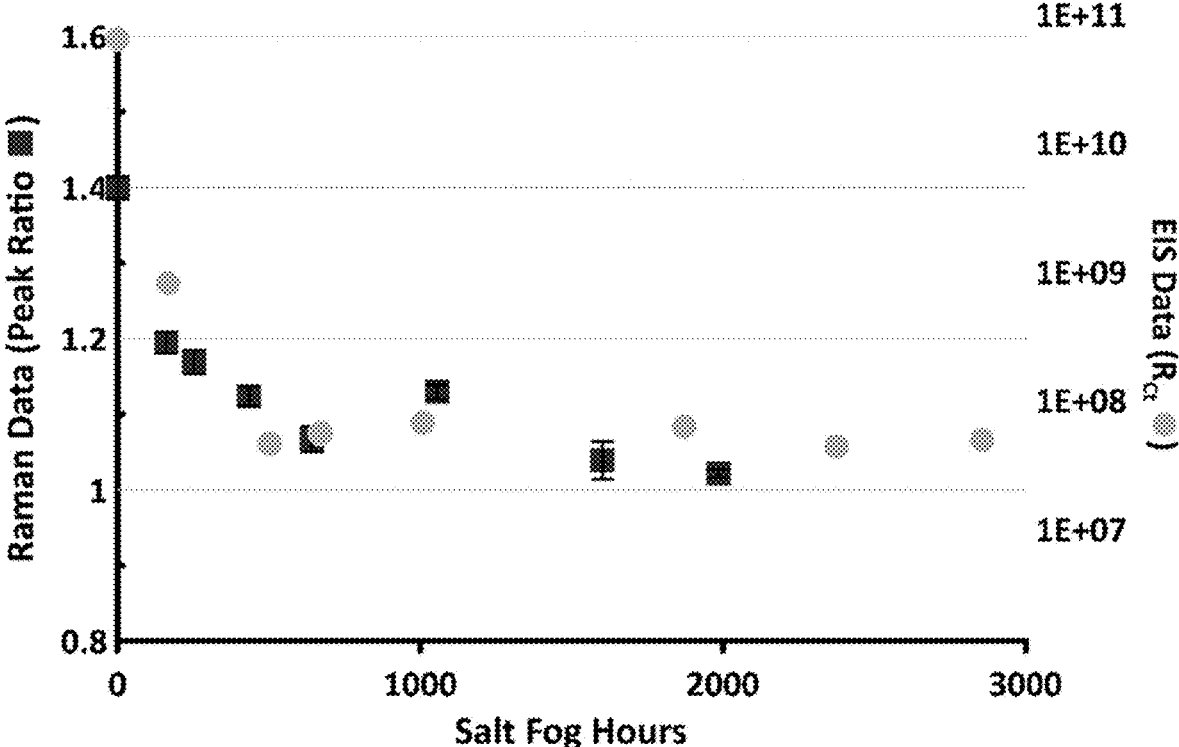
FIG. 8. A comparison of charge transfer resistance (RCT) measured by EIS and the change in Raman ratio over 2000+ hours exposure to ASTM 117.

FIG. 8 shows a comparison of charge transfer resistance (RCT) measured by EIS and the change in Raman ratio over 2000+ hours exposure to ASTM B117.

Figure 9:
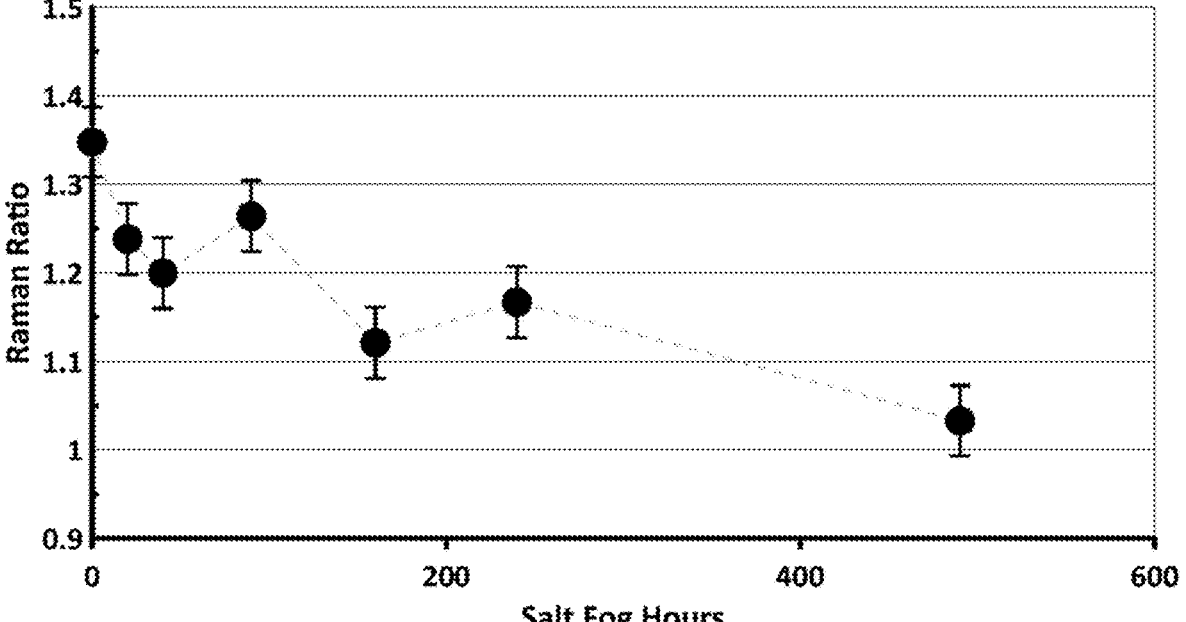
FIG. 9. Response of the Raman senor during corrosion on SAE 1008/1010 steel with Bonderite® pretreatment during ~500 hours exposure to ASTM 117.

FIG. 9 shows the response of the Raman senor during corrosion on SAE 1008/1010 steel with Bonderite® pre-treatment during ~500 hours exposure to ASTM B117.

Figure 10:
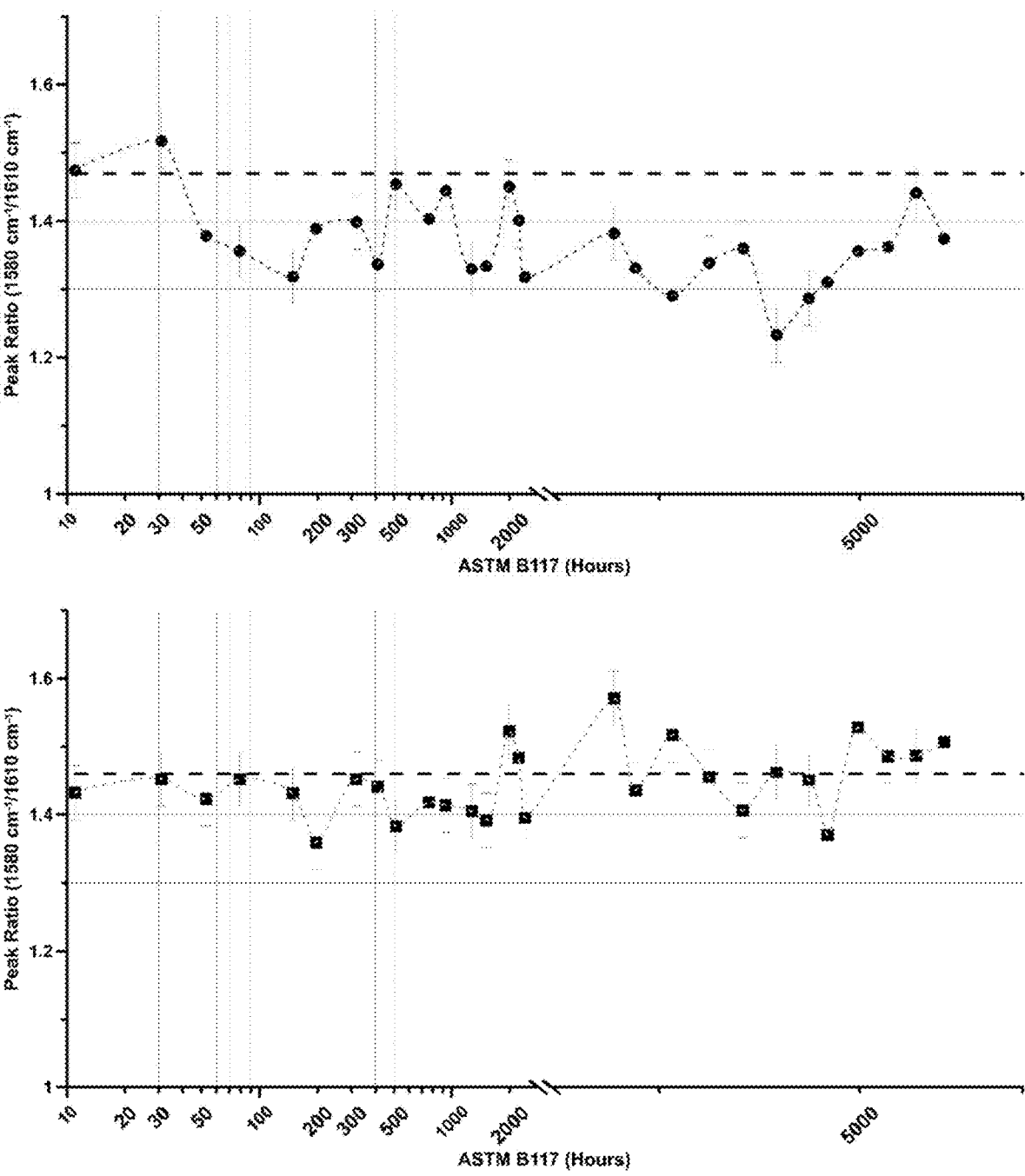
FIG. 10. Response of corrosion sensor on 12" square panel of AA2024 with 1 mil 53030D primer and edges sealed with epoxy after 5600 Hours in ASTM 117 salt fog.

FIG. 10 shows the response of corrosion sensor on 12" square panel of AA2024 with 1 mil 53030D primer and edges sealed with epoxy. Exposure to ASTM B117 is ~5600 hours. (Top) Sensor response at the bottom of the panel near scribe damage where water from salt fog collects and corrosion is accelerated. (Bottom) Sensor response in the opposite upper corner from scribe damage ~12" away is not responding to corrosion.

Figure 11:
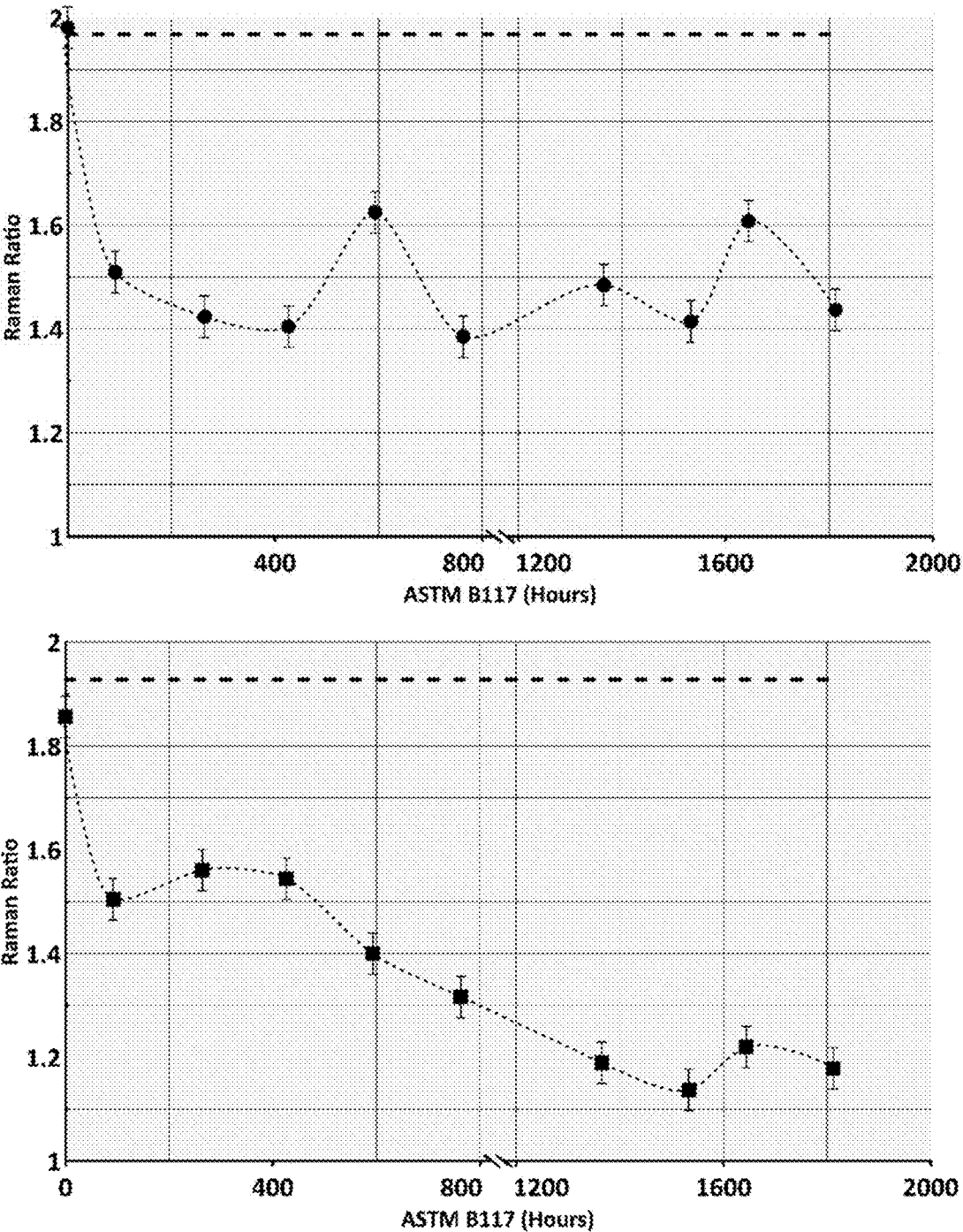
FIG. 11. Response of corrosion sensor on 12" square galvanic corrosion panel of AA2024 with 1 mil 53030D primer and edges sealed with epoxy, in the presence of zinc plated steel fasteners inserted on the panel.

FIG. 11 shows the response of corrosion sensor on 12" square galvanic corrosion panel of AA2024 with 1 mil 53030D primer and edges sealed with epoxy. Six zinc plated steel fasteners were applied across the top of the panel to drive galvanic corrosion. Sites close to scribe (top) or close to the steel fasteners (bottom) showed a drop in Raman ratio indicating corrosion progressing under primer across the entire panel face.

Figure 12:
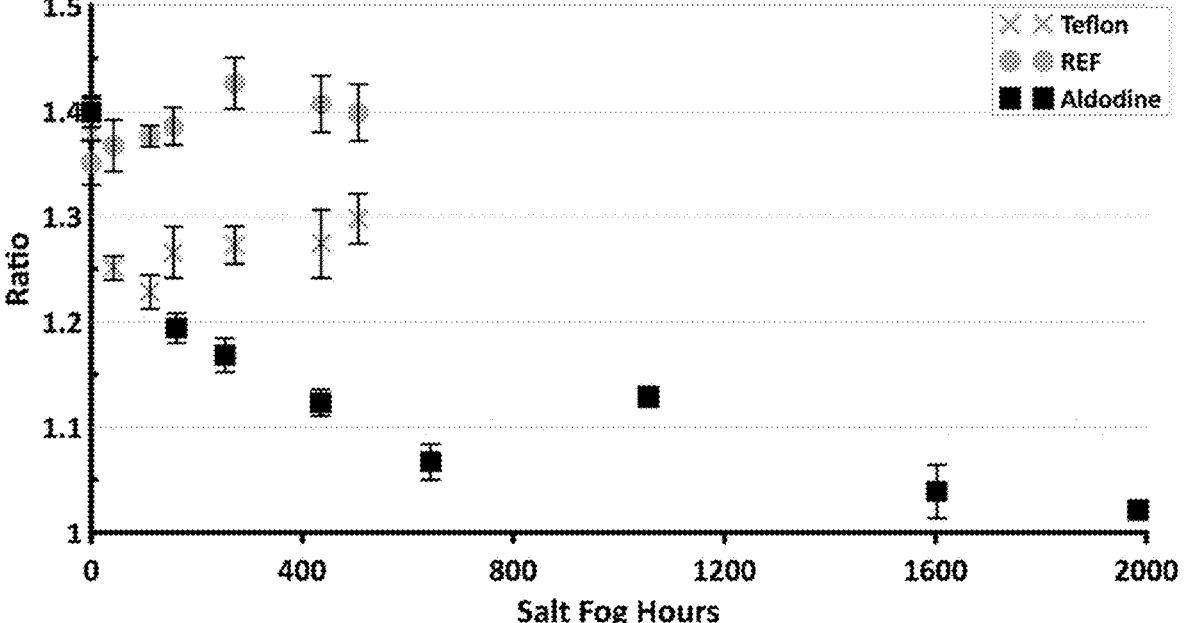
FIG. 12. The Raman ratio response for two controls and an Alodine® 1200 pre-treated panel.

FIG. 12 shows the Raman ratio response for two controls and an Alodine® 1200 pre-treated panel. The first control, a reference panel, was left out in a dry laboratory environment. The second control was a 3" square Teflon™ piece coated with MIL-53030D and subject to several hundred hours exposure in ASTM B117. Teflon™ is a polytetrafluoroethylene polymer. The ratio is steady around R=1.3. Some small change in Raman ratio are associated with equilibration of moisture levels around the sensor, due to the pKa of the carrier. These changes are very small, and stable, and much lower in magnitude than the continuous drop in ratio indicating a more acidic pH environment developing because of undercoat corrosion.

Figure 13:
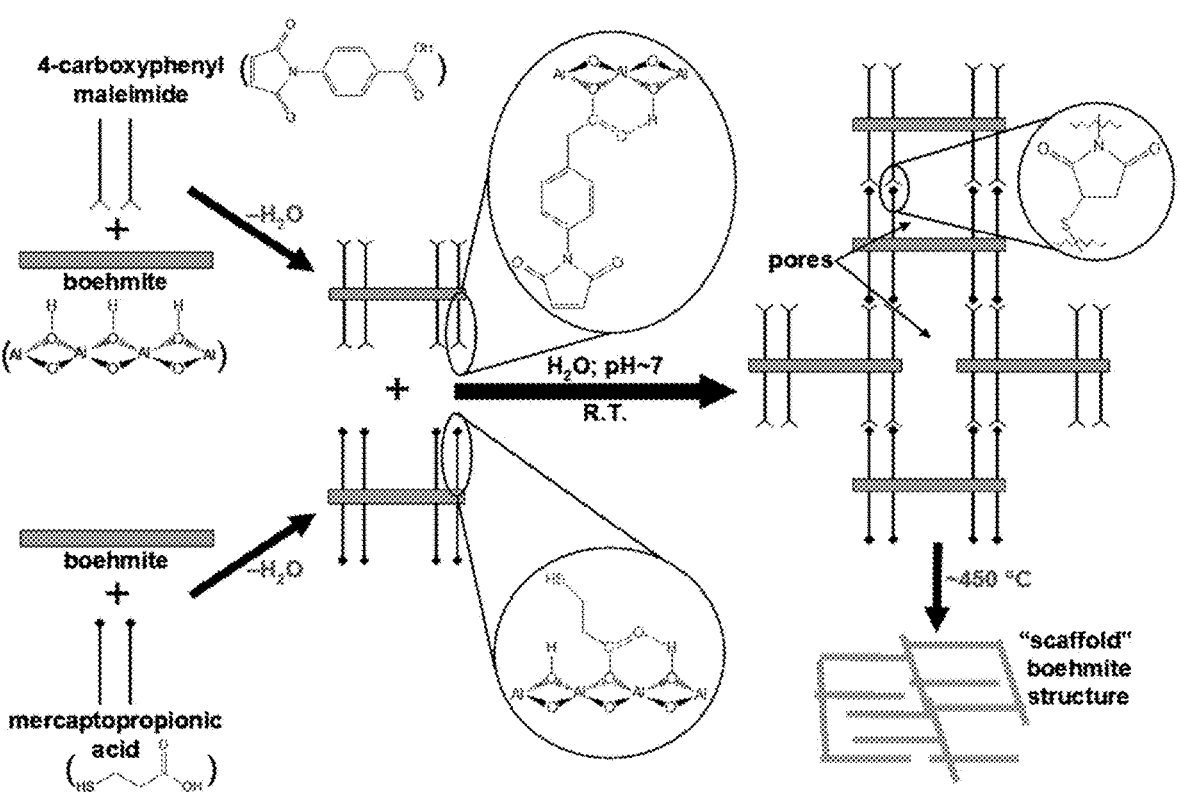
FIG. 13. A schematic of the self-assembly of 4-carboxy-maleimide and 3-mercaptopropionic acid surface modified boehmite nanoplatelets to form an organically pillared mesoporous boehmite nanocomposites having accessible mesopores.

FIG. 13 shows a schematic of the self-assembly of 4-carboxymaleimide and 3-mercaptopropionic acid surface modified boehmite nanoplatelets to form an organically pillared mesoporous boehmite nanocomposites having accessible mesopores.

Figure 14:
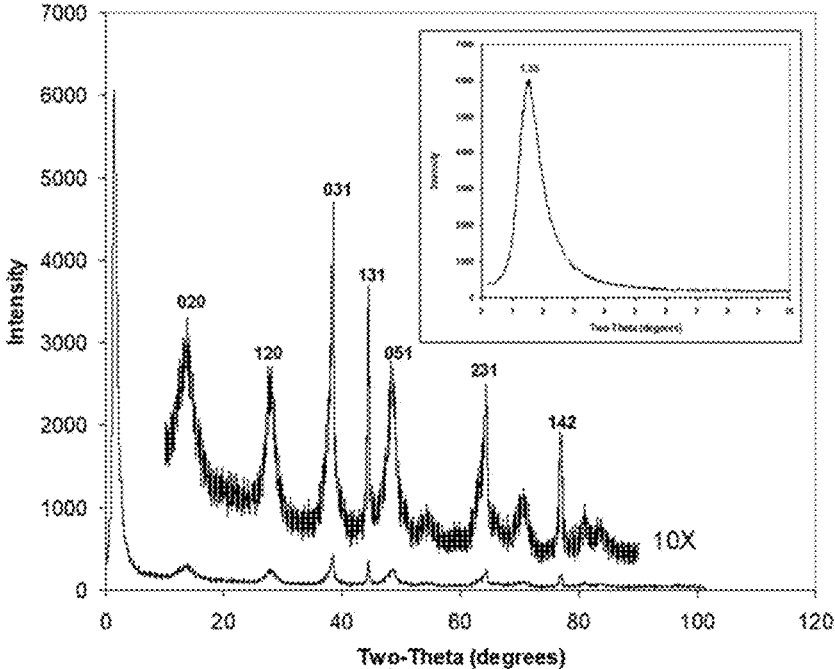
FIG. 14. An XRD pattern for an organically pillared mesoporous boehmite nanocomposite.
Figure 15:
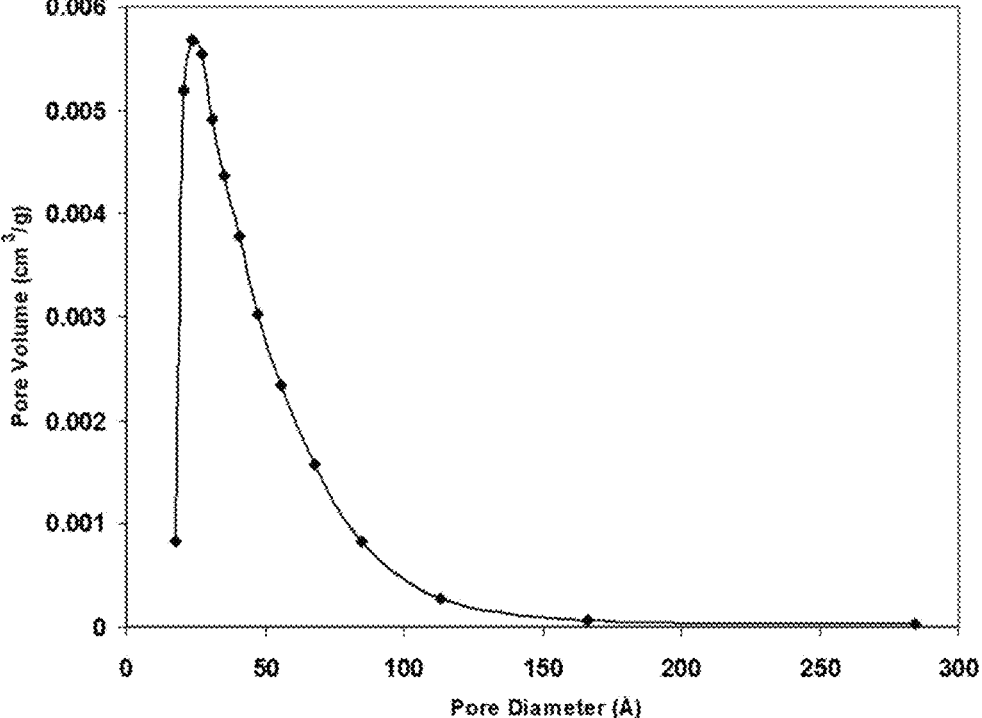
FIG. 15. the pore size distribution (BJH adsorption branch) of an organically pillared mesoporous nanocomposite. The pore size distribution is centered at approximately 36 Å

FIG. 14 shows an XRD pattern for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered and dried in air before the XRD pattern was obtained. FIG. 15 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered and dried in air before the pore size distribution was obtained. The pore size distribution is centered at approximately 36 Å.

Figure 16:
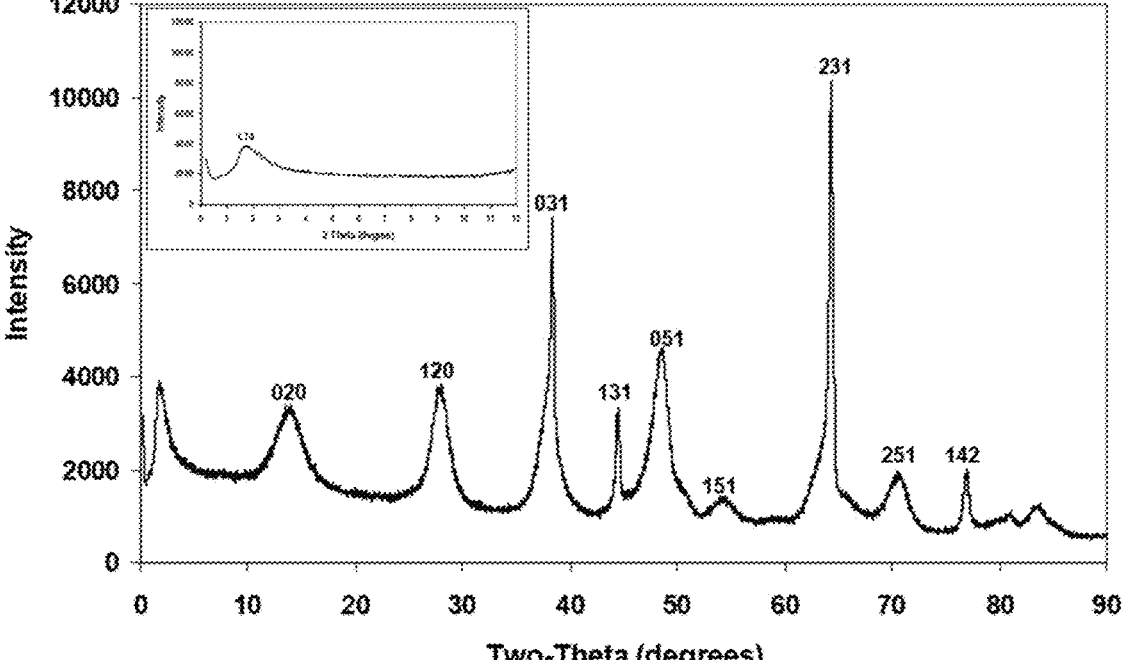
FIG. 16. An XRD pattern for a second organically pillared mesoporous boehmite nanocomposite.
Figure 17:
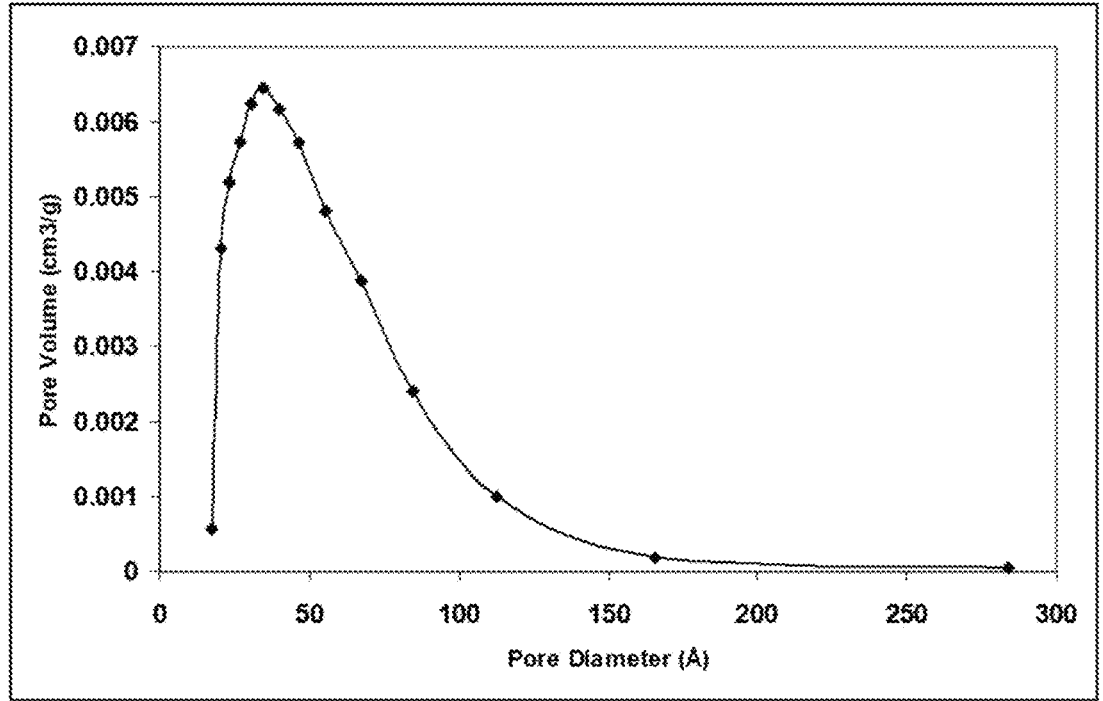
FIG. 17. The pore size distribution (BJH adsorption branch). The pore size distribution is centered at approximately 38 Å.

FIG. 16 shows an XRD pattern for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered, dried in air, re-dispersed in water, treated with hydrogen peroxide, filtered and dried in air before the XRD pattern was obtained. FIG. 17 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered, dried in air, re-dispersed in water, treated with hydrogen peroxide, filtered and dried in air before the pore size distribution was obtained. The pore size distribution is centered at approximately 38 Å.

Figure 18:
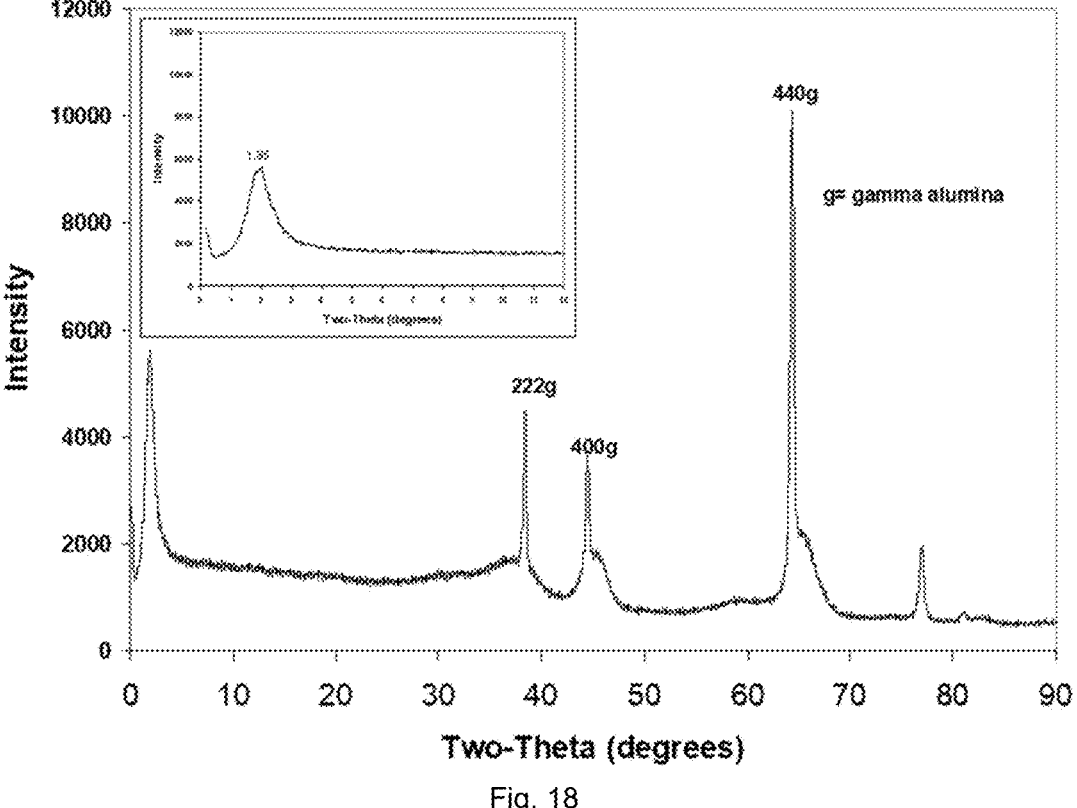
FIG. 18 An XRD pattern for a third organically pillared mesoporous boehmite nanocomposite.
Figure 19:
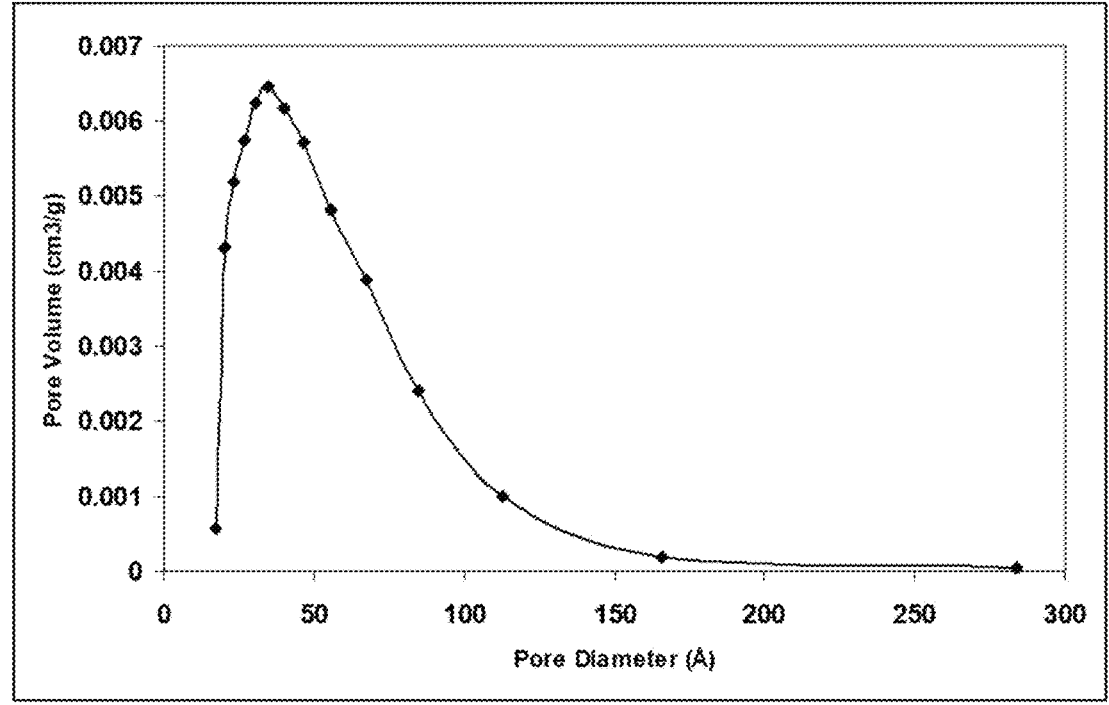
FIG. 19 The pore size distribution (BJH adsorption branch). The pore size distribution is centered at approximately 44 Å.

FIG. 18 shows an XRD pattern for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered, dried in air and then heated at 600° C. for six hours before the XRD pattern was obtained. FIG. 19 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered, dried in air and then heated at 600° C. for six hours before the pore size distribution was obtained. The pore size distribution is centered at approximately 44 Å.

Figure 20:
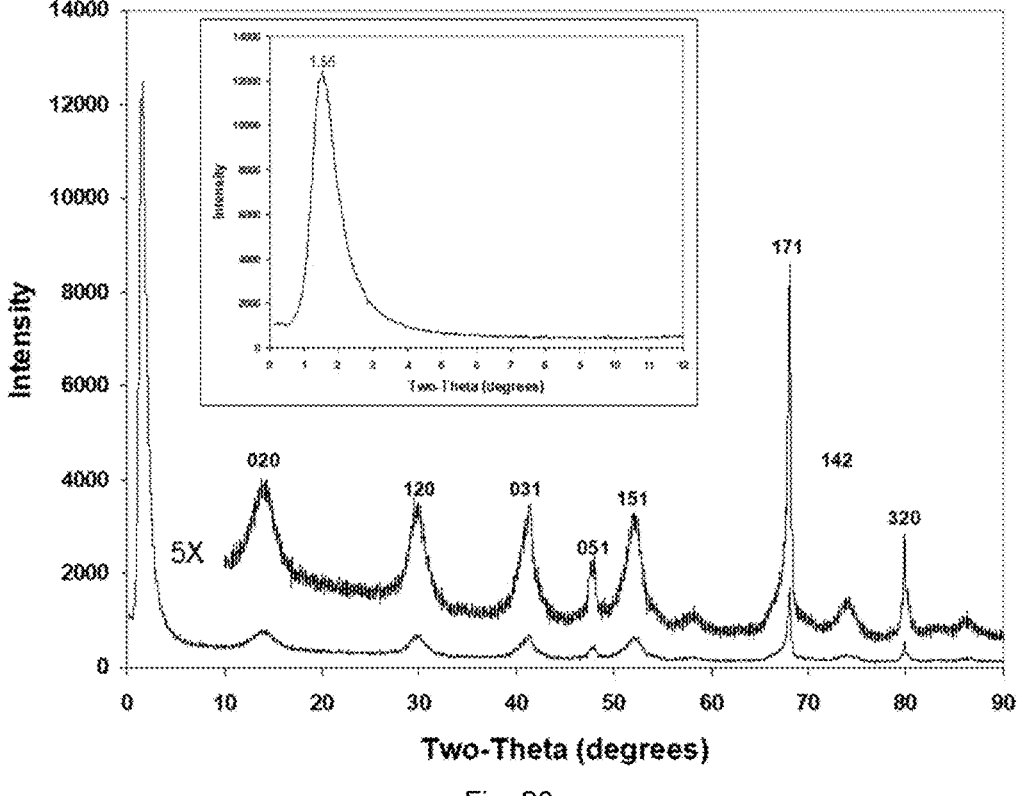
FIG. 20. An XRD pattern for a fourth organically pillared mesoporous boehmite nanocomposite.
Figure 21:
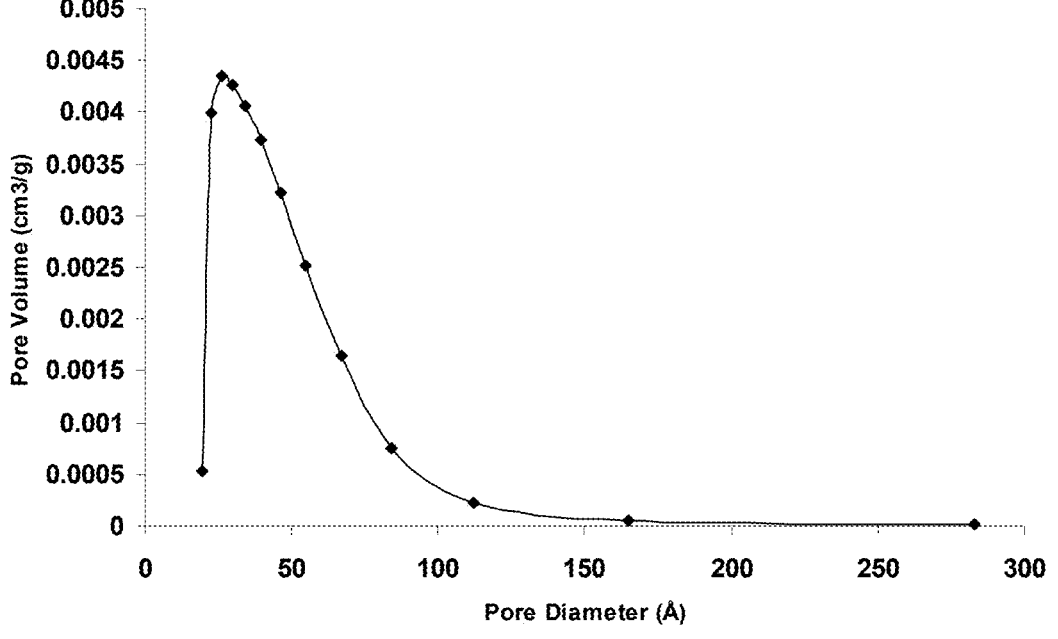
FIG. 21. The pore size distribution (BJH adsorption branch). The pore size distribution is centered at approximately 39 Å.

FIG. 20 shows an XRD pattern for an organically pillared mesoporous boehmite nanocomposite provided by the reaction of one set of surface-modified boehmite nanoplatelets having an AlOOH to 4-carboxymaleimide molar ratio of 16:1 and AlOOH to trifluoroacetic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered and dried in air before the XRD pattern was obtained. FIG. 21 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to trifluoroacetic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered and dried in air before the pore size distribution was obtained. The pore size distribution is centered at approximately 39 Å.

Figure 22:
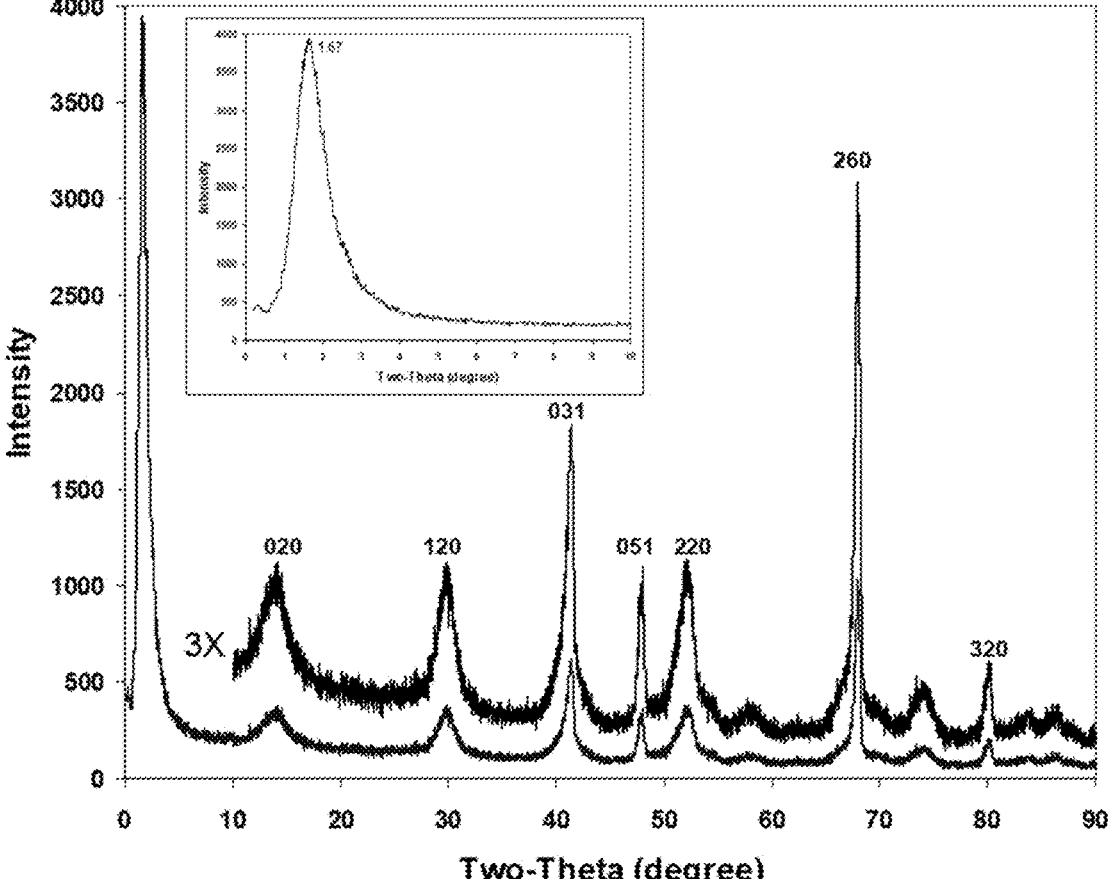
FIG. 22. An XRD pattern for a fifth organically pillared mesoporous boehmite nanocomposite.
Figure 23:
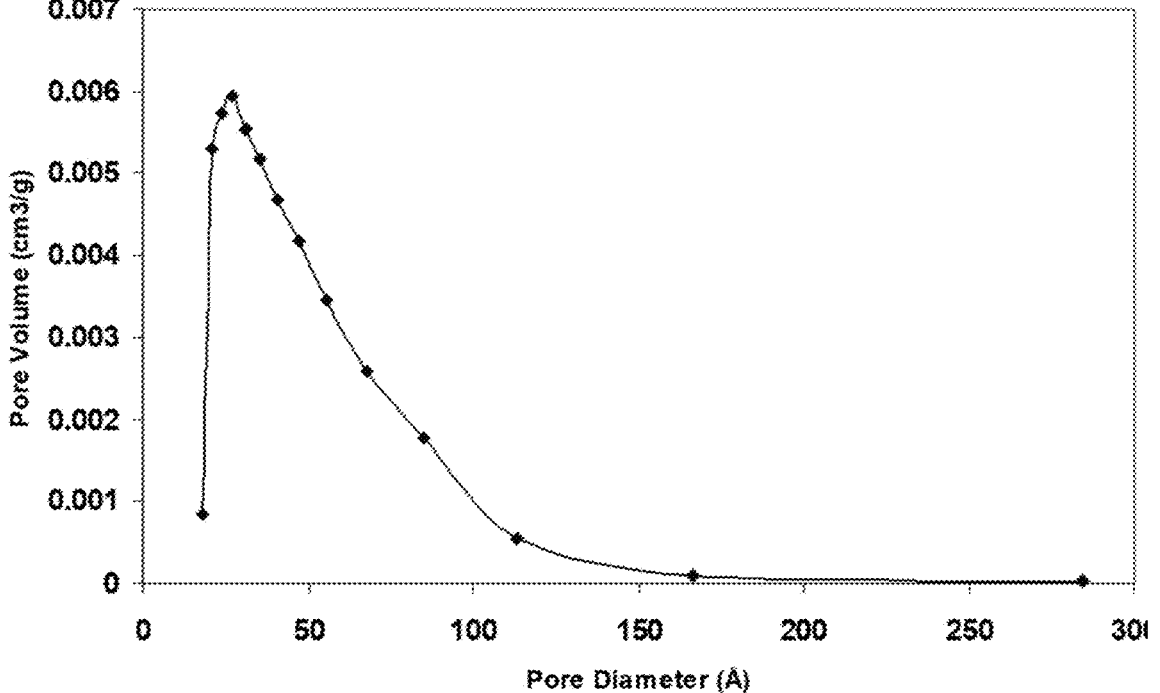
FIG. 23. The pore size distribution (BJH adsorption branch). The pore size distribution is centered at approximately 29 Å.

FIG. 22 shows an XRD pattern for an organically pillared mesoporous boehmite nanocomposite provided by the reaction of one set of surface-modified boehmite nanoplatelets having an AlOOH to 4-carboxymaleimide molar ratio of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered and dried in air before the XRD pattern was obtained. FIG. 23 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered and dried in air before the pore size distribution was obtained. The pore size distribution is centered at approximately 29 Å.

Figure 24:
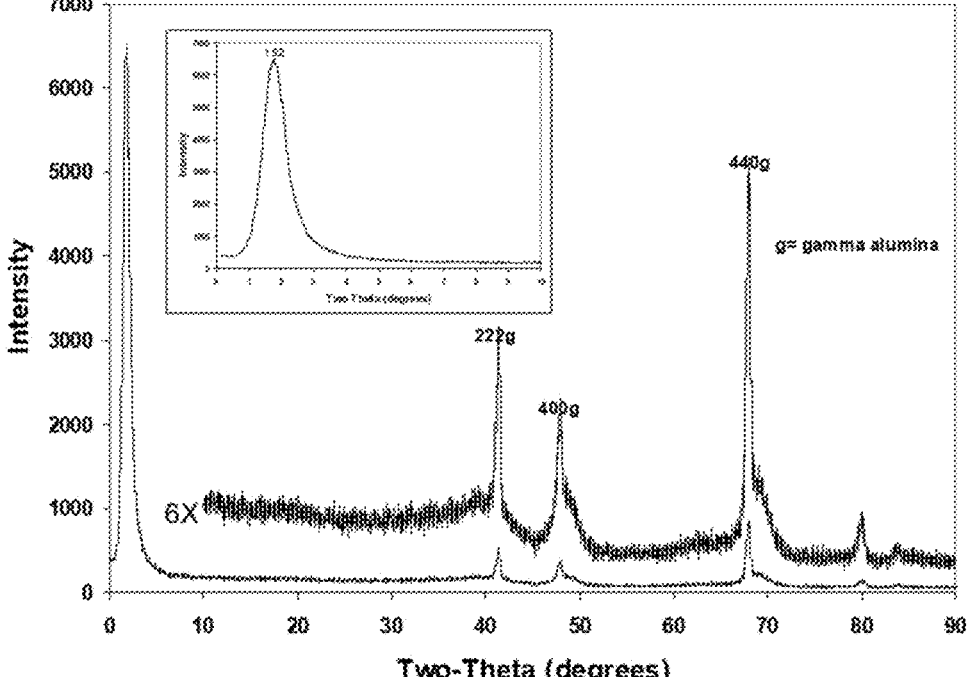
FIG. 24. An XRD pattern for a sixth organically pillared mesoporous boehmite nanocomposite.
Figure 25:
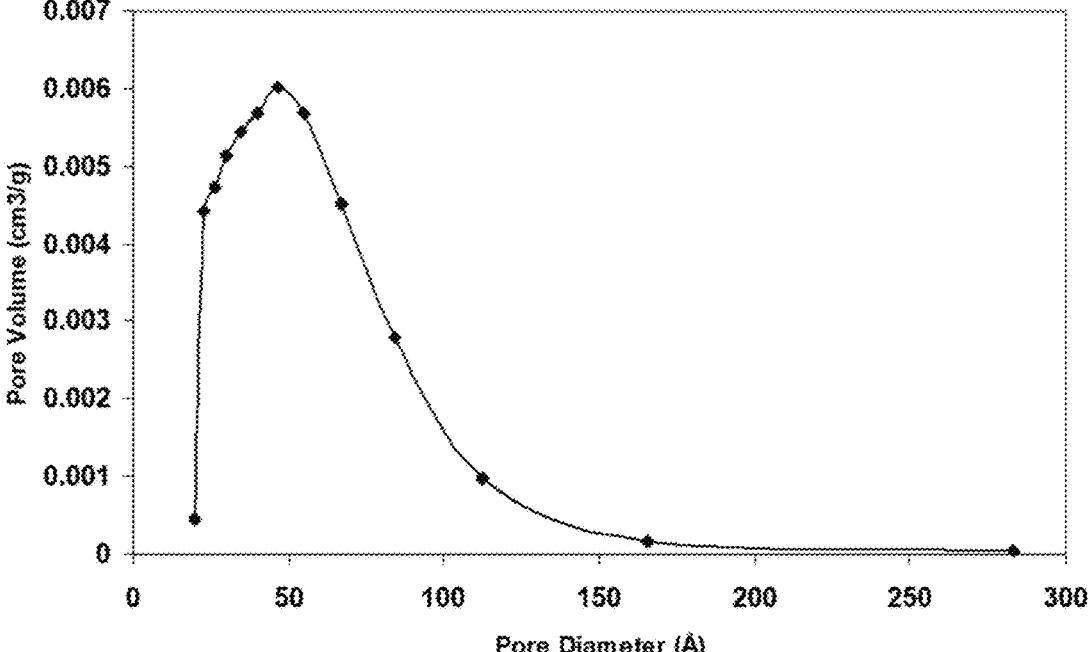
FIG. 25. The pore size distribution (BJH adsorption branch). The pore size distribution is centered at approximately 48 Å.

FIG. 24 shows an XRD pattern for an organically pillared mesoporous boehmite nanocomposite provided by the reaction of one set of surface-modified boehmite nanoplatelets having an AlOOH to 4-carboxymaleimide molar ratio of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered, dried in air and then heated at 600° C. for six hours before the XRD pattern was obtained. FIG. 25 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and a second set of surface modified boehmite nanoplatelets having an AlOOH to 3-mercaptoproionic acid ratio of 8:1 in water at a pH>5.5 wherein the boehmite precursor was Catapal® B. The resulting material was filtered, dried in air and then heated at 600° C. for six hours before the pore size distribution was obtained. The pore size distribution is centered at approximately 48 Å.

Figure 26:
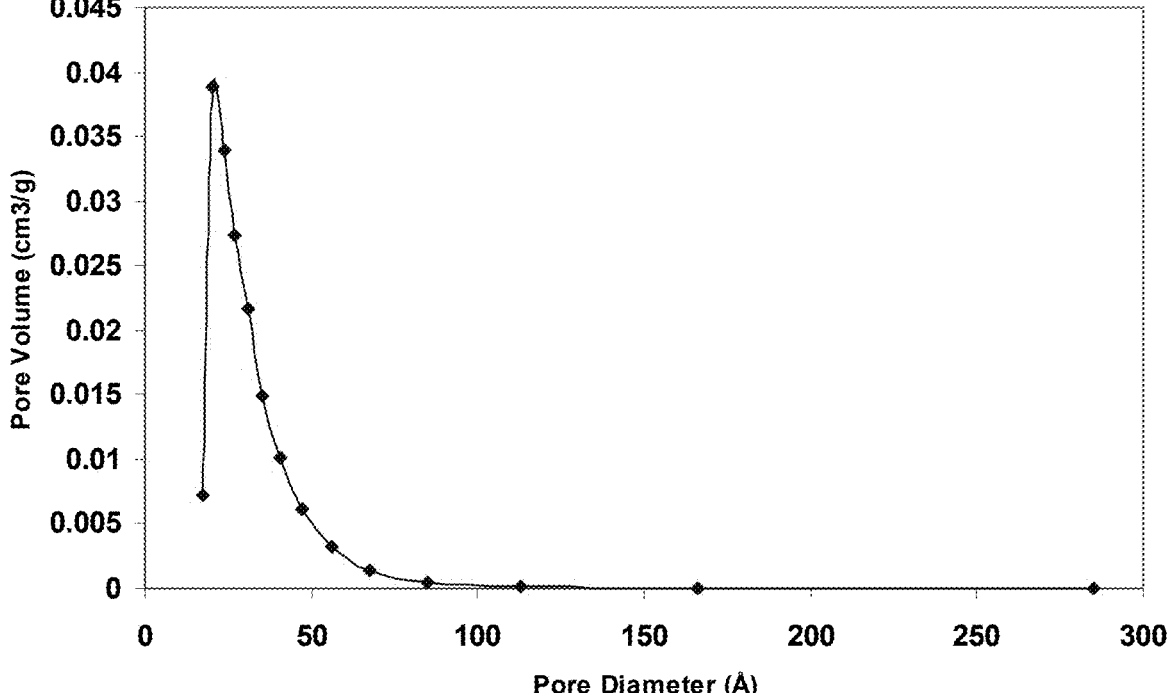
FIG. 26. The pore size distribution (BJH adsorption branch) for an organically pillared mesoporous boehmite nanocomposite where the precursor was pseudo boehmite. The pore size distribution is centered at approximately 32 Å.

FIG. 26 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercaptoproionic acid ratio of 8:1 in water at a pH>5.5 wherein the boehmite precursor was pseudoboehmite prepared by the hydrolysis of aluminum isopropoxide at 80° C. The resulting material was filtered and dried in air before the pore size distribution was obtained. The pore size distribution is centered at approximately 32 Å.

Figure 27:
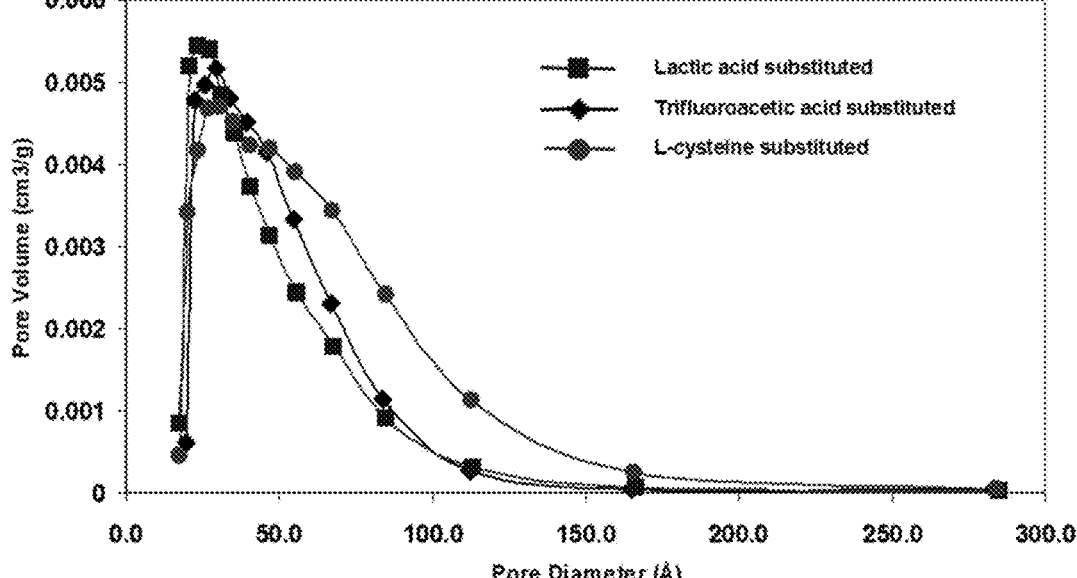
FIG. 27. Shows the pore size distribution (BJH adsorption branch) for three organically pillared mesoporous boehmite nanocomposites where the precursor was Catapal® B. The pore size distributions for the trifluoroacetic acid, lactic acid and 1-cysteine modified mesoporous nanocomposites are centered at approximately 40 Å, 36 Å and 46 Å respectively.

FIG. 27. shows the pore size distribution (BJH adsorption branch) for an organically pillared mesoporous boehmite nanocomposite provided by the reaction of 1) one set of surface-modified boehmite nanoplatelets having an AlOOH to 4-carboxymaleimide molar ratio of 16:1 and AlOOH to trifluoroacetic acid of 16:1 and a second set of surface modified boehmite nanoplatelets having an AlOOH to 3-mercaptoproionic acid ratio of 16:1 and a trifluoroacetic acid ratio of 16:1 in water at a pH>5.5 wherein the boehmite precursor was Catapal® B, 2) one set of surface-modified boehmite nanoplatelets having an AlOOH to 4-carboxyma-leimide molar ratio of 16:1 and AlOOH to lactic acid of 16:1 and a second set of surface modified boehmite nanoplatelets having an AlOOH to 3-mercaptoproionic acid ratio of 16:1 and a lactic acid ratio of 16:1 in water at a pH>5.5 wherein the boehmite precursor was Catapal® B and 3) one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 1-cysteine ratio of 8:1 in water at a pH>5.5 wherein the boehmite precursor was Catapal® B. The resulting material was filtered and dried in air before the pore size distributions were obtained. The pore size distributions for the trifluoroacetic acid, lactic acid and 1-cysteine modified mesoporous nanocomposites are centered at approximately 40 Å, 36 Å and 46 Å respectively.

Figure 28:
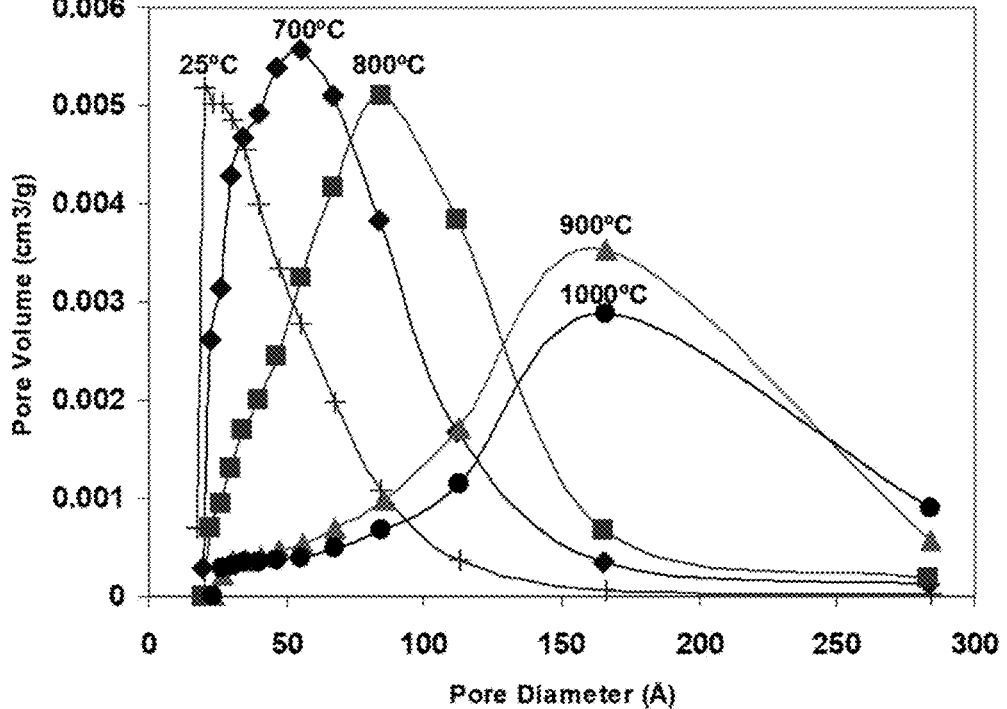
FIG. 28. The pore size distribution (BJH adsorption branch) for an organically pillared mesoporous boehmite nanocomposite heated at 700° C., 800° C., 900° C. and 1000° C. before the pore size distribution was obtained. The pore size distributions for the samples dried in air at 25° C. and heated at 700° C., 800° C., 900° C. and 1000° C. are centered at approximately 37 Å, 56 Å, 79 Å, 140 Å and 153 Å respectively.

FIG. 28 shows the pore size distribution (BJH adsorption branch) for an organically pillared mesoporous boehmite nanocomposite provided by the reaction of one set of surface-modified boehmite nanoplatelets having an AlOOH to 4-carboxymaleimide molar ratio of 16:1 and AlOOH to propionic acid of 16:1 and a second set of surface modified boehmite nanoplatelets having an AlOOH to 3-mercapto-proionic acid ratio of 8:1 in water at a pH>5.5 wherein the boehmite precursor wherein the boehmite precursor was Catapal® B. The resulting material was filtered and dried in air before the pore size distribution was obtained. Some of the resulting material was then heated at 700° C., 800° C., 900° C. and 1000° C. before the pore size distribution was obtained. The pore size distributions for the samples dried in air at 25° C. and heated at 700° C., 800° C., 900° C. and 1000° C. are centered at approximately 37 Å, 56 Å, 79 Å, 140 Å and 153 Å respectively.

FIG. 29 shows a comparison of water loss and Log P values calculated from ethyl esters of the acids.

Figure 30:
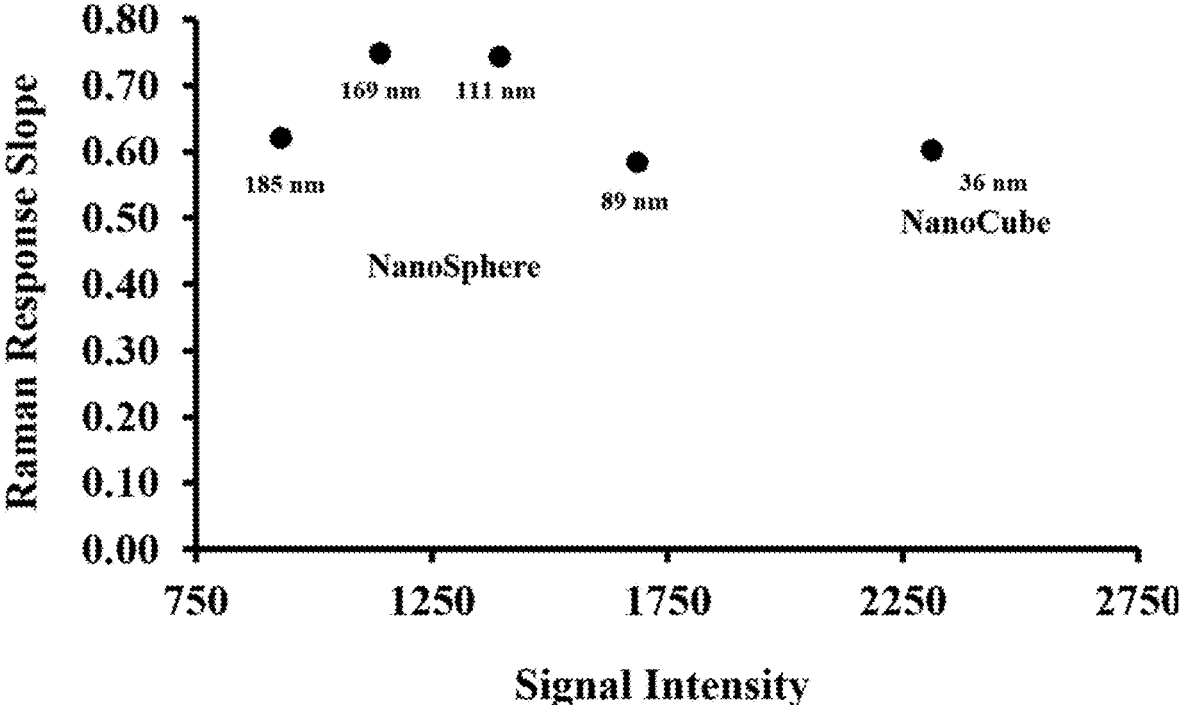
FIG. 30. Optimization of gold nanoparticle size based on Raman Response Slope (RRS) and raw signal intensity.

FIG. 30 shows the optimization of gold nanoparticle size based on Raman Response Slope (RRS) and raw signal intensity.

Figure 31:
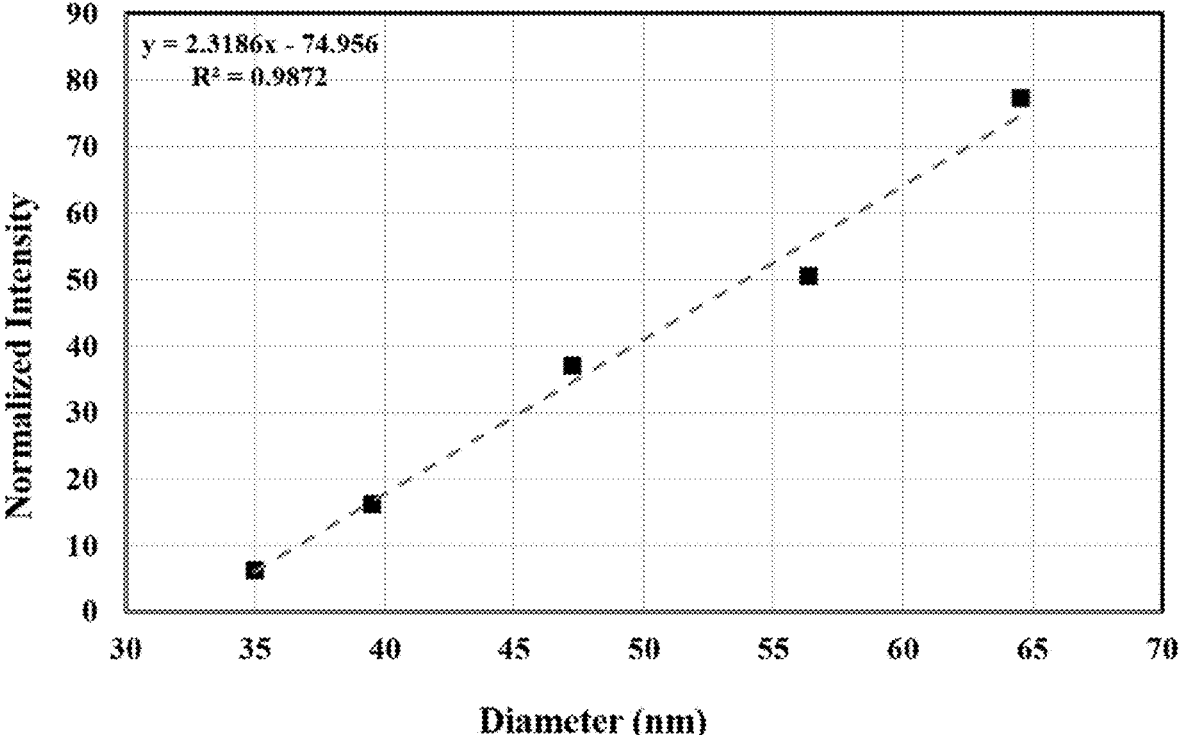
FIG. 31. Raman signal intensity as a function of nanoparticle size for silver.
Figure 32:
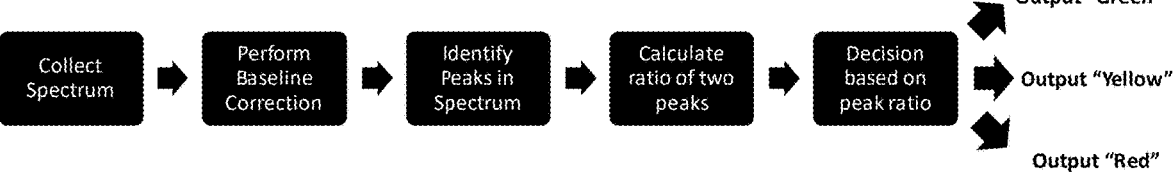
FIG. 32. Process flow for graphical-user-interface (GUI) for taking raw Raman spectrum and converting to alert (red, yellow green) output.

FIG. 31 shows the Raman signal intensity as a function of nanoparticle size for silver nanospheres.

EXAMPLES

Example 1. The Sensor does not Degrade the Performance of the Primer or Degrade the Interface Between the Primer and the Metal Surface, Because the Active Domain of the Sensor is Confined in an Unreactive Inorganic Carrier When the sensor is contained in the inorganic carrier, the epoxy cure proceeds as normal. Physical testing was done to confirm material properties remained within specification, even with the sensor package included (Table 1). Tests in both MIL-DTL-53030D (non-chrome) and MIL-PRF-23377 (chrome containing) primers showed the same hardness values compared to unmodified controls. MIL-PRF-23377 with TDA sensor performed the same in the MEK double rub test as the version containing TDA sensor. MIL-DTL-53030D showed the same performance for gloss and color when comparing sensor-doped or unmodified versions.

Example 2. The Sensor Response is Directly Correlated with Loss in Charge-Transfer-Resistance ($R_{ct}$) Over Time in ASTM B117 as Measured by Electrochemical Impedance Spectroscopy (EIS) on 3" Square Panels Electrochemical Impedance Spectroscopy (EIS) is a "gold standard" electrochemistry technique for studying the corrosion process. The impedance (real and imaginary components) of the system is mapped from 10 mHz up to 100 kHz. Several features, such as the solution resistance ($R_S$), the double layer capacitance ($C_{DL}$) can be determined directly from the raw data. Other variables such as the polarization resistance ($R_P$, also called charge-transfer-resistance, $R_{CT}$) can be inferred and then refined by fitting with the appropriate equivalent circuit model. Two types of EIS experiment were run. In the first case, a single 3"×3" panel coated with ~1 mill 53030 D was left in an EIS paint cell for 3000+ hours. EIS experiments, which take about 20 minutes to complete, were recorded at daily/weekly intervals. In the second test, a 3"×3" panel with 53030D was subject to salt fog accelerated corrosion in ASTM 117. This panel was pulled from the salt-fog at intervals of days/weeks, inserted into an EIS glass cell and analyzed. Each EIS analysis generated one $R_{CT}$ value for that time interval. Plotting all of the $R_{CT}$ values as a function of time show a fast decrease and then plateau as corrosion proceeds. Since $R_{CT}$ is inversely related to the corrosion current ($I_{Corr}$), the decrease in $R_{CT}$ as a function of time indicates more current is flowing across the panel face as the corrosion is enhanced from the accelerated test protocol.

The Raman pH ratio measured over the same time interval as the EIS data collection shows the same pattern for aggressive, accelerated corrosion on a 3" square panel. The ratio drops quickly then reaches a plateau. The origin of the higher [H⁺] is the dissolution of Al metal (anodic half cell). As $I_{Corr}$ increases, the concentration of [Al3⁺] increases, and the pH of the solution between metal and primer decreases. Thus it make sense the change in $R_{CT}$ and the under-coat pH reflected by the Raman sensor track together (FIG. 8).

Example 3. The Sensor Response is Inversely Correlated to an Increase in Current Passed Over 3" AA2024 Panel with Steel Fasteners in ASTM B117

Further comparison with work done by the Ohio State University on 3" panels with stainless steel fasteners has measured the corrosion current directly. The observation is a fast increase in current flowing across the panel face up to 800 hours in ASTM B117, followed by a plateau of the current passed from 800 to 2000 hours. The increase in current is inversely related to the decrease in pH.

Example 4. The Sensor Responds when Used with Epoxy Primers on AA2024 Panels with or without Chromium Conversion Coatings FIG. 7 show the Raman ratio response in the presence of corrosion occurring in ASTM 117 on 3"×3" panels of AA2024. Panels were prepared with a chromium conversion coating (Alodine® 1200), cleaned with PreKote©, or left untreated (Bare). In each case the sensor responds to the corrosion underneath the primer. In each experiment the Raman ratio experiences a fast-initial drop. The time for this drop to happen is slower for the Alodine® 1200 panel in comparison to panels cleaned with PreKote© or left bare. This is shown in FIG. 6.

Example 5. The Sensor Responds in the Presence of Corrosion in Epoxy Primers on AA2024 and SAE 1008/1010 Steel with Bonderite® Pretreatment The anodic half-cell reaction for the corrosion of steel ($Fe^{(O)} \rightarrow Fe^{3+} + 3H^+$) also leads to a decrease in pH between the metal surface and the primer (FIG. 2). 3"×6" panels of SAE 1008/1010 steel with Bonderite® pretreatment were scribed and subject to 2000 Hours in ASTM 117 accelerated corrosion test. The fast-initial drop in the ratio along with a plateau was also observed in this case, and tracked visual corrosion (rusting) of the panel (FIG. 6).

Example 6. The Sensor Readout Reflects Changes in Corrosion Rate on Large 12" Square Panels Four 12" square panels of AA2024-T3 with epoxy sealed edges were made up and subjected to at least 2000 hours in ASTM B117 salt fog. Each panel was coated with MIL-DTL-53030D primer, 1 mil thick. The first panel (SP1) had a single scribe on the lower right-hand corner of the panel. The second panel (SP2) had a scribe placed in the center of the panel. Panel 4 and 5 (SP4 and SP5) each had a scribe in the lower right-hand corner of the panel. In addition, these two panels had six steel fasteners attached across the top to drive galvanic corrosion. The hypothesis was that the aluminum dissolving due to galvanic corrosion at the top of the panel would also provide a second contact point with the aluminum dissolving at the scribe to set up stronger corrosion currents and further accelerate corrosion. SP4 had stainless steel 316 fasteners, while SP5 had zinc-coated steel fasteners.

After exposure to ASTM B117 was complete, each panel was stripped in a solvent bath of (5% phenol dissolved in benzyl alcohol) for at least 24 hours and the surface of the metal under the coating was inspected. Corrosion undercoat was typified by three different morphologies. The first were wide, shallow blister regions with a red/dark brown deposit which is likely copper (I) oxide. The copper is liberated from the AA2024 alloy during corrosion, so deposits of copper (I) oxide (red) or Copper (II) oxide (blue/green) are indicative of extremely aggressive corrosion. The "large" copper deposits were several cm across, and observed primarily on SP4 and SP5. Smaller (~1 cm diameter) blister deposits were present on SP2. Another morphological feature were white blemishes, which are collections of many (100's) of microscopic pits which have formed in the metal surface due to accelerated corrosion. Panel SP4 and SP5 were nearly covered in the white blemishes in every area which wasn't already covered in a red copper (I) oxide deposit. Panel SP2 was predominantly covered with the white blemishes and (6 or 7) copper (I) oxide deposits≤1 cm in diameter. Panel SP1 lacked any copper (I) oxide deposits (other than around the scribe), and had very few of the white blemishes anywhere on the panel face. The predominant feature of SP1 was uncorroded AA2024, even after 5000 hours in ASTM B117. Damage was quite severe at the scribe, where in two locations corrosion had created holes in two spots through the 800-micron thick sheet of AA2024.

The response of sensor incorporated into the primer was collected at multiple time points over the time in ASTM B117. For SP4 and SP5, the ratio drops precipitously very quickly, then plateaus, very much like the response observed with the 3" AA2024 panels without edge seal. An example is shown for panel SP-4 in FIG. 11. For panel SP2, the ratio drops more slowly, and includes some oscillations but generally trends downward into a plateau at later time points.

For SP1 the sensor response is more complicated (FIG. 10). Smaller oscillations are observed at all points across the panel face in the sensor readout. As time progresses, the magnitude of these oscillations increases outside the bounds of measurement error and become quite large. Points measure which are most distal from the scribe (FIG. 10, bottom) show hardly any deviation from initial value (within measurement uncertainty) over several thousand hours. Points measured at the bottom of the panel near the scribe show stronger oscillations and strong drops in the Raman ratio (FIG. 10, top). Measurements taken across the blister which forms on the scribe in the lower right-hand corner show acidic (low ratio) and basic (higher ratio) pH regions within 1-2 cm of one another. The lowest ratios on the blister reach 1.0.

The rate at which the sensor responds indicated corrosion was progressing slowest for SP1 and fastest for SP4 and SP5, with SP2 somewhere in the middle. Visual inspection of the metal surface after the coating was removed confirms this. Thus the sensor and its read out of pH under the coating is distinguishing corrosion happening at different rates under the coating.

Example 7. The Sensor Readout can Indicate Acidic Regions or Basic Regions of Corrosion on the Metal Surface, Under the Coating The width of the 785 nm laser beam used with the Raman spectrometer is approximately 100 μm in diameter, which is the effective area the probe is reporting on. We have observed that acidic pH changes (lower Raman ratios) are associated with flat (unblistered) surfaces of 3" and 12" panels during accelerated corrosion. Many times, more basic pH changes are associated with blister sections (higher Raman ratios). On the 12" panels where the blisters are large (2-4 cm rough diameter), regions of basicity and acidity can exist within the same blister. We believe these readings are reporting on the spatial location of anodic (acidic) and cathodic (basic) spots on the panel face.

Example 8. Hydraulic Fluid and Aerospace Lubricating Oil

Both of these common aerospace fluids are "Raman transparent", so the sensor readout is not changed when trying to assess corrosion under primer fouled with oils on top. The Raman readout laser at 785 nm penetrates the fluid.

Example 9. The Sensor is Responding to Change in pH and not Just the Presence of Water in the Salt Fog Environment The sensor response stays the same over time for panels that are not subject to accelerated corrosion. The sensor response also does not change when in the presence of accelerated salt fog corrosion, but in the absence of metal. In FIG. 12 primer was loaded with corrosion sensor and sprayed out on a 3"×3" Teflon™ coupon. The Teflon™ coupon was placed into ASTM 117 salt fog for 600 hours.

The initial ratio was constant because there was no metal present for corrosion to take place on.

Example 10. Preparation of Nanostructured Carrier

The first embodiment of thus invention is directed towards the preparation of a mesoporous organic pillared boehmite nanocomposite. Boehmite and pseudoboehmite (the latter is a more disorganized crystal structure containing more water within the crystallites) are used interchangeably in the following discussions. The preparation of surface modified boehmite nanoparticles from the reaction of boehmite and carboxylic acids were first described in 1992, which is incorporated by reference herein. The initial reactions between boehmite powders were carried out in refluxing xylenes. If the carboxylic acid is a heat stable liquid, then the surface modified boehmite nanoparticles can be prepared by addition of the pseudoboehmite to the liquid acid and heating under reflux conditions for several days. These materials were shown to be nanoparticles with carboxylates covalently bound to the aluminum oxyhydroxide surface. The surface modified boehmite nanoparticles are air and water stable materials whose physical properties are dependent on the identity of the substituents attached to the carboxylic acid group. For water soluble carboxylic acids the surface modified boehmite nanoparticles can be prepared by heating boehmite and the carboxylic acid in water at elevated temperatures all which are incorporated by reference herein.

In Cook et al. U.S. Pat. No. 6,369,183, a composition of matter is discussed wherein surface modified boehmite nanoparticles having reactive functional groups are reacted with other surface modified boehmite nanoparticles or reactive resins to form inorganic-organic polymers. In these materials the desire was to form dense polymers. While a broad coverage of reactive groups are claimed, the authors did not claim surface modified boehmite nanoparticles with aromatic maleimide groups. In MacQueen, U.S. Patent Application 2006/0233713 Al, preferred carboxylic acids for surface modified boehmite nanoparticles including hetero-bifunctional polyethylene glycols (HB-PEGs) (Nektar Therapeutics, Birmingham, Ala.) having a carboxylic acid at one end of the PEG molecule and another functional group at the other end such as an amine, succinimide ester, maleimide, vinyl sulfone, thiol, etc. wherein the HB-PEG typically has an average molecular weight of about 1000 to 6000, and preferably about 2,000-4,000 are described. However an aromatic bifunctional maleimide was not described.

The mesoporous organic pillared boehmite nanocomposite compositions of this invention were prepared by two general pathways. The first method utilizes reaction between two sets of different surface modified boehmite nanoparticles. The first set of surface modified boehmite nanoparticles have at least some part of their surfaces covered with aromatic maleimides attached to the boehmite surface through a carboxylate group and the second set of surface modified boehmite nanoparticles has as least some part of their surface covered with thiols attached to the boehmite surface through a carboxylate group. The two sets of surface modified boehmite nanoparticles are reacted in water under near neutral conditions to form the desired organic pillared mesoporous boehmite composition. In the second general method the boehmite surface modified boehmite nanoparticles at least some part of their surfaces covered with aromatic maleimides or with thiols and the desired organic pillared mesoporous boehmite compositions are prepared by reaction with dithiols or dimaleimides respectively In the more preferred embodiment of this invention, the surface modified boehmite nanoparticles are provided by reaction of propionic acid and 4-carboxyphenylmaleimide with Catapal® B in a water/alcohol mixture at temperatures between 80° C. and the boiling point of water. Additional surface modified boehmite nanoparticles are provided by reaction of mercaptopropionic acid with Catapal® B in water at temperatures between 80° C. and the boiling point of water. For both sets of materials, after the reaction the materials are cooled and the solvents (water or water/alcohol) are removed by room temperature evaporation in air and resulting powders are each redispersed into water and the pH adjusted by additional of a aqueous solution of potassium hydroxide (or ammonium hydroxide or sodium hydroxide) and the two solutions are poured together at room temperature. The resulting mixture thickens and then the mixture is heated to 65° C. The mixture is cooled to room temperature the excess water decanted off, and the resulting reaction mixture was poured into a recrystallizing dish to air dry. The thickening observed when the aqueous solutions of the thiol- and maleimide-surface modified boehmite nanoparticles are mixed is due to the cross-linking between the double bond of the maleimide groups and the thiol groups attached to the surface of the boehmite nanoparticles. The double bond of the maleimide group undergoes an alkylation reaction (Michael-type electrophilic addition) by forming a stable thioether bond with thiol groups. Maleimide reactions are specific for thiols in the pH range 6.5-7.5. At pH 7, the reaction of the maleimide with thiols proceeds at a rate 1000 times greater than its reaction with amines.

The powders resulting from mixing the aqueous solutions of the thiol- and maleimide-surface modified boehmite nanoparticles were characterized by powder x-ray diffraction and nitrogen adsorption methods. Evidence for a mesostructured boehmite/organic nanocomposite is provided by the presence of at least one x-ray diffraction line in the low angle region of the diffraction spectra corresponding to a lattice spacing of at least 20 Å. In addition, the diffraction patterns of the mesostructured boehmite/organic nanocomposite exhibit wide angle reflections characteristic of the individual boehmite nanoparticles. The low angle reflection is indicative of a network that is ordered on a mesoscopic length scale (i.e., 20 Å to 500 Å.), whereas the wide angle reflections show that the particles comprising the mesoscopic network are the boehmite nanoparticles.

The mesostructured boehmite/organic nanocomposite prepared by the maleimide/thiol-based self-assembly approach is unique. In previous attempts to prepare mesostructured boehmite materials either templates or surfactants are combined with boehmite precursors and a precursor structure is formed. The resulting precursor structure is then chemically or thermally treated to remove the organic portion so as to produce the desired mesoporosity. In the present embodiment, mesoporosity is inherent within the organically pillared boehmite nanoparticles as evidenced by both the x-ray diffraction patterns and the nitrogen adsorption data. The organically pillared boehmite nanoparticle network contains pores, the sizes of which are dictated by the length of the organic pillars and the length of the non-pillared surface groups. In this invention, the aromatic maleimide is not limited to 4-carboxyphenyl maleimide but can be readily extended but not limited to other aromatic maleimides such as 3-hydroxy-4-carboxyphenylmaleimide.

The second principal embodiment of this invention is directed to formation of the organic pillared mesoporous boehmite compositions by reaction of dithiols or dimaleimides with aromatic-maleimide-surface modified boehmite nanoparticles or thiol-surface modified boehmite nanoparticles respectively. In this embodiment boehmite surface modified boehmite nanoparticles having at least some part of their surfaces covered with aromatic maleimides were dispersed into water and added to a aqueous solution of the dithiol structure and then the pH of the mixture was adjusted to near neutral conditions. The solution thickened and the materials was filtered and air dried. The resulting materials showed a mesoporous pore size distribution that was wider and the average size of the pores were larger than the most preferred embodiment described above.

The mesoporous organic pillared boehmite nanocomposite compositions of this invention can be heated to remove the organic pillars forming fully inorganic mesoporous structures. Heating the mesoporous organic pillared boehmite nanocomposite compositions in air to 450° C. removes the organic pillars and provides a mesoporous boehmite composition. Heating the mesoporous organic pillared boehmite nanocomposite compositions in air to above 500° C. transforms the mesoporous boehmite composition to a mesoporous gamma-alumina composition. Continued heating of the mesoporous gamma-alumina composition causes the surface area to decrease and the pore size to increase. However, even at 1000° C. the gamma-alumina is still mesoporous with an average pore size of 153 Å. Thus the present invention provides for the formation of mesoporous boehmite and mesoporous gamma-alumina by heating the mesoporous organic pillared boehmite nanocomposite compositions in air to temperatures above 450° C.

It is also an preferred embodiment of this invention that the properties of the pores of the mesoporous organic pillared boehmite nanocomposite compositions can be changed by using different organics Replacing 3-mercaptopropionic acid as the surface functionalization agent for the surface modified boehmite nanoparticles with I-cysteine (e.g. L-2-Amino-3-mercaptopropionic acid) leads to, after reaction with the maleimide-surface modified boehmite nanoparticles, formation of a mesoporous organic pillared boehmite nanocomposite composition having chiral pillars.

Starting from surface modified boehmite nanoparticles that have a surface coverage lower than a molar ratio of Al:Organic acid of 8:1, mesoporous organic pillared boehmite nanocomposite compositions can be formed (using the maleimide-thiol reactions previously discussed) that can be post modified with additional carboxylic acids. To the above compositions, I-lysine or I-cysteine can be attached to the boehmite nanoparticle surface to provide chiral functionality. Furthermore, starting from surface modified boehmite nanoparticles that have a surface coverage lower than a molar ratio of Al:Organic acid of 8:1, mesoporous organic pillared boehmite nanocomposite compositions can be formed that can be post modified with additional carboxylic acids having amine groups (e.g. aminoacetic acid, aminobutyric acid aminocaproic acid or I-lysine) or that under pH conditions lower than their pKa will provide positive charges in the pores of the mesoporous organic pillared boehmite nanocomposite compositions. Alternatively, the mesoporous organic pillared boehmite nanocomposite compositions can be post modified with carboxylic acids containing quaternary amines (e.g. betaine) to provide positive charges in the pores of the mesoporous organic pillared boehmite nanocomposite compositions regardless of the compositions.

Still furthermore, starting from surface modified boehmite nanoparticles that have a surface coverage lower than a molar ratio of Al:Organic acid of 8:1, mesoporous organic pillared boehmite nanocomposite compositions can be formed that can be post modified with dicarboxylic acids (e.g. oxalic acid, malonic acid, succinic acid, glutaric acid, adipic acid, pimelic acid, suberic acid, azelaic acid, sebacic acid, etc.), sulphonate containing carboxylic acids, or phosphate containing carboxylic acids that under pH conditions higher than their pKa will provide positive charges into the pores of the mesoporous organic pillared boehmite nanocomposite compositions.

Also starting from surface modified boehmite nanoparticles that have a surface coverage lower than a molar ratio of Al:Organic acid of 8:1, mesoporous organic pillared boehmite nanocomposite compositions can be formed that can be post modified with dicarboxylic acids having different Log P values such that the pores can be made more hydrophilic or more hydrophobic. Thus it is a preferred embodiment of this invention that post-modification of the mesoporous organic pillared boehmite nanocomposite compositions using carboxylic acids containing secondary or tertiary functional groups can be used to modify the properties of the pores of the mesoporous organic pillared boehmite nanocomposite compositions.

Another embodiment of this invention is the reaction of aliphatic amine surface modified boehmite nanoparticles with the maleimide-surface modified boehmite nanoparticles to carry out the self-assembly process. The double bond of maleimide readily undergoes an alkylation reaction with thiol groups to form stable thioether bonds in the pH range of 6.5 to 7.5. In this pH range the reaction of the maleimide with thiol proceeds at a rate 1000 times greater than its reaction with amines. However at higher pH ranges the reactivity of the aliphatic amines with the maleimide increases. In this embodiment of this invention, the surface modified boehmite nanoparticles are provided by reaction of propionic acid and 4-carboxyphenylmaleimide with Catapal® B in a water/alcohol mixture at temperatures between 80° C. and the boiling point of water. Additional surface modified boehmite nanoparticles are provided by reaction of 3-aminopropionic acid with Catapal® B in water at temperatures between 80° C. and the boiling point of water. For both sets of materials, after the reaction the materials are cooled and the solvents (water or water/alcohol) are removed by room temperature evaporation in air and resulting powders are each redispersed into water and the pH adjusted by additional of a aqueous solution of potassium hydroxide (or ammonium hydroxide or sodium hydroxide) to the pH range of 8.5 to 9 and the two solutions are poured together at room temperature. The resulting mixture thickens and then the mixture is heated to 65° C. to form the self-assembled boehmite nanostructure. The surface areas and pore sizes for the pH=9 self-assembled mesoporous boehmite nanostructures and the resulting burned out (600° C. air 6 hours) mesoporous gamma-alumina are 238 m2/g 45 Å (surface area/pore size) and 254 m2/g/54 Å (surface area/pore size) respectively.

In the examples provide below, the synthesis and properties of the mesoporous organic pillared boehmite nanocomposite compositions and their conversion to mesoporous gamma-alumina are demonstrated. The as synthesized mesoporous organic pillared boehmite nanocomposite compositions and the calcined mesoporous alumina compositions were characterized by X-Ray diffraction (XRD) using an INELCPS 120 diffraction system (CuK□ radiation). The presence of low angle diffraction peaks corresponding to average pore to pore correlation lengths of at least 20 Å was indicative of a hierarchical mesostructured. Wide angle XRD patterns were used to indicate the presence of the boehmite platelets or gamma alumina following calcination.

Nitrogen BET surface areas, pore volumes and framework pore sizes were determined using nitrogen adsorption-desorption methods. The sorptometer used to record the adsorption-desorption isotherms was a Micromeritics Gemini 2380 automated surface area and pore size analyzer. The samples for adsorption measurement were degassed at 150° C. and <10-s torn for 12 h before measurement. In defining the pore size distribution we applied the BJH model to both the adsorption and desorption isotherms in order to characterize the frame work pore structure.

For all samples the 4-carboxyphenylmaleimide was prepared in the following manner Maleic anhydride (90.40 gm, 0.922 mol) and 4-Aminobenzoic acid (126.40 gm, 0.922 mol) were added to anhydrous N,N-dimethylformamide (500 ml) under Argon at room temperature and allowed to stir for one hour. Anhydrous Sodium Acetate (7.2 gm, 0.088 mol) and Acetic Anhydride (144.0 ml, 1.526 mol) were then added and the temperature increased to 45° C. After three hours stirring at 45° C. the reaction was poured into stirring distilled water (6000 ml). The precipitated yellow solid was then suction filtered, washed with water (200 ml×3), and placed into a recrystallization dish to air dry. The 3-hydroxy-4-carboxyphenyl maleimide was prepared in the same way.

Example 10-1 (first step) This example illustrates the preparation of the maleimide surface modified boehmite nanoparticles. The maleimide surface modified boehmite nanoparticles were prepared by placing mixed alcohols (0.4 L) into a 2 L round bottom flask and heating to 75° C. Propionic Acid (3.26 gm, 0.044 mol) and 4-carboxyphenyl-maleimide (9.56 gm, 0.044 mol) were added and allowed to fully dissolve. Distilled water (0.4 L) and Catapal® B (50.0 gm, 0.704 mol) were then added and the reaction was allowed to stir overnight. The following day the reaction was poured into a recrystallizing dish to air dry. After sieving through a 230-mesh screen, 48.76 grams of a tan powder was recovered. Using the same procedure the 3-hydroxy-4-carboxyphenyl maleimides were prepared.

Example 10-2 (second step) This example illustrates the preparation of the mercaptopropionic acid surface modified boehmite nanoparticles. The 3-mercaptopropionic acid surface modified boehmite nanoparticles were prepared by placing 5000 mls of distilled water into a 1 L three necked round bottom flask equipped with a reflux condenser, overhead stirrer and a heating mantle. The water has heated to 80° C. and 50 grams (0.704 mol) of Catapal® B and 9.341 grams (0.088 mol) of 3-mercaptopropionic acid were added. The mixture was stirred overnight at temperature and then cooled to room temperature and poured into a recrystallizing dish to air dry.

Example 10-3 (step three) This example illustrates the preparation of the mesoporous organic pillared boehmite nanocomposite composition provided by reaction of the 4-carboxyphenylmaleimide surface modified Catapal® B with 3-mercaptopropionic acid surface modified Catapal® B. 3-Mercaptopropionic acid surface modified Catapal® B (2.0 gram, prepared as described in Example 10-2) was placed into 40 ml of distilled water and the pH adjusted to 6.6 with KOH. Two grams of the 4-carboxyphenylmaleimide surface modified Catapal® B was also added to 40 mls of distilled water and the pH adjusted to 6.4 with KOH. The two aqueous mixtures were then poured together into a third flask where the mixture was observed to thicken. The reaction mixture was then heated to 65° C. for several hours and then allowed to cool to room temperature. After a few hours, the excess water was decanted and the reaction mixture was poured into a recrystallizing dish to air dry. After drying 3.7 gm of a light yellow powder obtained. A strong diffraction peak is observed at a two-theta of 1.55° which corresponds to a spacing of 55 Å. At larger two-theta values the x-ray diffraction patent is consistent with boehmite. The average pore size distribution as determined by applying the BJH model to the adsorption/desorption curves is centered around 36 Å.

Example 10-4 (optional step) This example illustrates the preparation of a hydrogen peroxide treated mesoporous organic pillared boehmite nanocomposite composition provided by reaction of the 4-carboxyphenylmaleimide surface modified Catapal® B with 3-mercaptopropionic acid surface modified Catapal® B followed by treatment with a 20% hydrogen peroxide solution. The said material was prepared as described as described in Example 10-3 and then redispersed into water and treated with a 20% hydrogen peroxide solution and gentle heating to 65° C. for several hours. The hydrogen peroxide treatment was followed by filtration and washing of the treated material with distilled water, after which the materials was then air dried. A strong diffraction peak is observed at a two-theta of 1.74° which corresponds to a spacing of 49 Å. At larger two-theta values the x-ray diffraction patent is consistent with boehmite. The average pore size distribution as determined by applying the BJH model to the adsorption/desorption curves is centered around 38 Å.

Example 10-5 (alternate preparation) This example illustrates the preparation of the mesoporous gamma alumina composition. The materials prepared in Example 10-3 were heated to 600° C. for six hours in air. A strong diffraction peak is observed at a two-theta of 1.95° which corresponds to a spacing of 44 Å. At larger two-theta values the x-ray diffraction patent is consistent with gamma-alumina. However, there also appears to be some boehmite still present in the sample even after heating to 600° C. for six hours in air. The average pore size distribution as determined by applying the BJH model to the adsorption/desorption curves is centered around 44 Å.

Example 10-6 This example illustrates the preparation of the mesoporous organic pillared boehmite nanocomposite composition provided by reaction of the 4-carboxyphenyl-maleimide surface modified Catapal® B with 3-mercaptopropionic acid surface modified Catapal® B wherein the 4-carboxyphenylmaleimide surface modified Catapal® B is provided without any additional surface modification provided by a second carboxylic acid.

4-Carboxyphenylmaleimide (0.182 mol, 39.5 g) and Catapal® B (2.916 mols, 175 grams) were added to 3 L of distilled water and the mixture was heated to 138° C. under pressure for two hours. The mixture was allowed to cool and the water was decanted off and the wet product allowed to air dry. 3-Mercaptopropionic acid surface modified Catapal® B (2.0 grams)(prepared as described in Example 10-2) was placed into 40 ml of distilled water and the pH adjusted to 6.6 with KOH. Two grams of the 16:1 AlOOH: 4-carboxyphenylmaleimide surface modified Catapal® B (prepared as described above) were added to 40 mls of distilled water and the pH adjusted to 6.4 with KOH. The two aqueous mixtures were then poured together into a third flask where the mixture was observed to thicken. The reaction mixture was then heated to 65° C. for several hours and then allowed to cool to room temperature. After a few hours, the excess water was decanted and the reaction mixture was poured into a recrystallizing dish to air dry. A strong diffraction peak is observed at a two-theta of 1.67° which corresponds to a spacing of 51 Å. At larger two-theta values the x-ray diffraction patent is consistent with boehmite. The average pore size distribution as determined by applying the BJH model to the adsorption/desorption curves is centered around 29 Å.

Example 10-7: This example illustrates the preparation of the mesoporous gamma alumina composition. The materials were heated to 600° C. for six hours in air. A strong diffraction peak is observed at a two-theta of 1.82° which corresponds to a spacing of 47 Å. At larger two-theta values the x-ray diffraction patent is consistent with gamma-alumina. However, there also appears to be some boehmite still present in the sample even after heating to 600° C. for six hours in air. The average pore size distribution as determined by applying the BJH model to the adsorption/desorption curves is centered around 48 Å.

Example 10-8: This example illustrates the preparation of the mesoporous organic pillared boehmite nanocomposite composition provided by reaction of the 4-carboxyphenyl-maleimide surface modified boehmite with 3-mercaptopropionic acid surface modified boehmite where the boehmite was prepared by hydrolysis of aluminum isopropoxide.

Aluminum isopropoxide (575.35 g, 2.82 mol) was added to 2.5 L of stirring distilled water that had been heated to 80° C. After 30 minutes 15 grams (0.141 mol) of 3-mercaptopropionic acid were added to the mixture and the mixture stirred for an additional hour. An additional 22.4 g (0.211 mol) of 3-mercaptopropionic acid were added to the mixture and stirred overnight at temperature. The translucent gel was then air dried in a recrystallizing dish. Similarly, aluminum isopropoxide (575.35 g, 2.82 mol) was added to 1.6 L of stirring distilled water that had been heated to 80° C., and after 30 minutes 9.48 grams (0.128 mol) of propionic acid were added to the mixture and the mixture stirred for an additional hour. Then 1.6 L of mixed alcohols and 4-carboxyphenylmaleimide (50.98 grams, 0.2347 mol) were added to the mixture and stirred overnight. The resulting mixture was then was then air dried in a recrystallizing dish.

3-Mercaptopropionic acid surface modified boehmite (2.0 grams)(prepared as described in this example was placed into 40 ml of distilled water and the pH adjusted to 6.6 with KOH. Two grams of the 4-carboxyphenylmaleimide surface modified boehmite also prepared as described in this example was also added to 40 mls of distilled water and the pH adjusted to 6.4 with KOH. The two aqueous mixtures were then poured together into a third flask where the mixture was observed to thicken. The reaction mixture was then heated to 65° C. for several hours and then allowed to cool to room temperature. After a few hours, the excess water was decanted and the reaction mixture was poured into a recrystallizing dish to air dry. The average pore size distribution as determined by applying the BJH model to the adsorption/desorption curves is centered around 32 Å.

Example 10-9: This example illustrates the preparation of the 1-cysteine surface modified boehmite nanoparticles. The 1-cysteine surface modified boehmite nanoparticles were prepared by placing 5000 mls of distilled water into a 1 L three necked round bottom flask equipped with a reflux condenser, overhead stirrer and a heating mantle. The water has heated to 80° C. and 50 grams (0.704 mol) of Catapal® B and 10.66 grams (0.088 mol) of 1-cysteine acid were added. The mixture was stirred overnight at temperature and then cooled to room temperature and poured into a recrystallizing dish to air dry.

Example 10-10: This example illustrates the preparation of the mesoporous organic pillared boehmite nanocomposite composition with a chiral pillar provided by reaction of the 4-carboxyphenylmaleimide surface modified Catapal® B with 1-cysteine surface modified Catapal® B. L-Cysteine surface modified Catapal® B (2.0 grams)(prepared as described in Example 11) was placed into 40 ml of distilled water and the pH adjusted to 6.6 with KOH. Two grams of the 4-carboxyphenylmaleimide surface modified Catapal® B was also added to 40 mls of distilled water and the pH adjusted to 6.4 with KOH. The two aqueous mixtures were then poured together into a third flask where the mixture was observed to thicken. The reaction mixture was then heated to 65° C. for several hours and then allowed to cool to room temperature. After a few hours, the excess water was decanted and the reaction mixture was poured into a recrystallizing dish to air dry. The average pore size distribution as determined by applying the BJH model to the adsorption/desorption curves is centered around 46 Å.

Example 10-11: This example illustrates the preparation of a mesoporous alpha-alumina composition prepared by first heating the materials provided in Example 10-3 in air at 600° C. to remove the organics and then using incipient wetness technique to coat the gamma-alumina surfaces with ammonium fluoride. Upon heating the ammonium fluoride doped to 900° C. the ammonium fluoride decomposes leaving a fluoride doped gamma alumina surface that undergoes a phase transition to produce mesoporous alpha alumina. The BET surface area of the mesoporous alpha alumina is 60.6 m2/g and the average pore size (by the BJH method) is 112 Å

Example 10-12: This example illustrates the preparation of a mesoporous gamma-alumina composition prepared by heating the materials provided in Example 10-3 in air at 700° C., 800° C., 900° C. and 1000° C. for six hours respectively. The average pore size distribution as determined by applying the BJH model to the adsorption/desorption curves are centered at approximately 56 Å, 79 Å, 140 Å and 153 Å for the materials at 700° C., 800° C., 900° C. and 1000° C. respectively.

Example 10-13: 3-Aminopropionic acid (15.68 gm, 0.176 mol) and Catapal® B (100.0 gm, 1.41 mol) were added to stirring H2O (0.9 L) and heated to 80° C. The reaction was allowed to run overnight. The following morning the reaction was poured into recrystallizing dishes and allowed to air dry. Once dry, the product was ground and sieved through a 120-mesh screen to give 94.36 gm of a white powder. The 3-aminopropionic acid surface-modified boehmite nanoparticles (10 grams) and the maleimide-surface modified boehmite nanoparticles (10 grams)(Example 10-1) were suspend in separate beakers in 50 ml of water and their pH's adjusted to pH 9.0 with the addition of aqueous KOH. The solutions were mixed together and shortly after mixing the solutions began to gel. The reaction mixture was then heated to 65° C. for several minutes and then allowed to cool to room temperature. The gel was air dried, producing 18.13 grams of a light tan powder for a value. The surface area and the average pore size of the mesoporous self-assembled boehmite nanoparticles in this example were 238 m2/g and 45 Å respectively.

Example 10-14: The materials were placed into oven and heated in air at 100° C. for 1 hour, then 600° C. for 6 hours at a temperature ramp of 2° C./min). The heated powder provided 6.39 grams of a white powder with surface area and the average pore size of the mesoporous gamma-alumina phase of 254 m2/g and 54 Å respectively.

It is intended that the foregoing descriptions be only illustrative of the present invention and that the present invention be limited only by the hereinafter appended claims.

Additional Description of Carriers and Preferred Carriers of the Present Invention.

An optional carrier is a mesostructured composition comprising boehmite or pseudoboehmite nanoplatelets and organic pillars exhibiting at least one low angle x-ray diffraction line corresponding to a lattice spacing of at least 20 Å, a BJH average pore diameter of at least 20 Å and multiple wide angle x-ray diffraction lines corresponding to diffraction peaks for boehmite or pseudoboehmite nanoplatelets wherein the mesostructured composition is formed by reaction of one surface modified boehmite or pseudoboehmite nanoplatelet composition reacting with a second surface modified boehmite or pseudoboehmite nanoplatelet composition having a different composition. Optionally, boehmite or pseudoboehmite nanoplatelets are surface-modified with a p-carboxy-aromatic-maleimide and the second set of boehmite or pseudoboehmite nanoplatelets are surface-modified with α-carboxy-Ω-thiol and the two sets are mixed together in water at a pH exceeding 6 to form the organically pillared mesoporous compositions. Furthermore, preferred embodiments are boehmite or pseudoboehmite nanoplatelets are surface-modified with 4-carboxyphenyl-maleimide and the second set of boehmite or pseudoboehmite nanoplatelets are surface-modified with an α-carboxy-Ω-thiol selected from mercaptoacetic acid, 3-mercaptopropionic acid, mercapto-oleic acid, mercaptoricinoleic acid, mercaptolinoleic acid, mercaptostearic acid, mercaptovaleric acid, mercaptohexanoic acid, mercaptooctanoic acid, mercaptolevulinic acid, mercaptolauric acid, mercaptobehenic acid, mercaptopalmitic acid, mercaptocyclohexane carboxylic acid, 3-mercapto-2,3-dimethyl butyric acid or 3-mercaptobutyric acid and the two sets are mixed together in water at a pH exceeding 5.5 to form the organically pillared mesoporous compositions. Other preferred carriers boehmite or pseudoboehmite nanoplatelets are surface-modified with 3-hydroxy-4-carboxyphenylmaleimide and the second set of boehmite or pseudoboehmite nanoplatelets are surface-modified with an α-carboxy-Ω-thiol selected from mercaptoacetic acid, 3-mercaptopropionic acid, mercaptooleic acid, mercaptoricinoleic acid, mercaptolinoleic acid, mercaptostearic acid, mercaptovaleric acid, mercaptohexanoic acid, mercaptooctanoic acid, mercaptolevulinic acid, mercaptolauric acid, mercaptobehenic acid, mercaptopalmitic acid, mercaptocyclohexane carboxylic acid, 3-mercapto-2,3-dimethyl butyric acid, 3-mercaptobutyric acid and the two sets are mixed together in water at a pH exceeding 5.5 to form the organically pillared mesoporous compositions. The Al:Maleimide molar ratio may be in the range of 8:1 to 24:1. The Al:thiol molar ratio may be in the range of 8:1 to 24:1.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

What is claimed is:

1. A corrosion detecting composition: comprising, a nanoparticles, wherein the nanoparticle comprises a coinage metal selected from the group consisting of gold, silver and copper; at least one adsorbate associated with the nanoparticle; wherein the adsorbate displays a responsive surface enhanced Raman scattering (SERS) spectral response that is a function of pH; and a carrier, wherein the nanoparticle is supported on the carrier; wherein the at least one adsorbate has a coinage metal attachment function group and a pH sensitive function group; wherein the at least one adsorbate is selected from the group consisting of 4-mercapto pyridine, 5-methylthio-1,3,4-thiadiazole-2-thiol, mercaptobenzimidazole, 2,5-dimercapto-1,3,4-thiadiazole and 6-mercaptopyridine-3-carboxylic acid; wherein the at least one adsorbate comprises a protonatable organic functional group that displays a responsive surface enhanced Raman scattering (SERS) spectral response that is a function of pH over the range from pH 4 to pH 12: wherein the at least one adsorbate contains a coinage metal attachment functional group which is a thiol; wherein the protonatable organic functional group is selected from the group consisting of pyridine, carboxylate, amine, and aromatic amine; further comprising a latent reactive epoxy monomer or a latent reactive epoxy resin; wherein the carrier is dispersed in the latent reactive epoxy monomer or the latent reactive epoxy resin; wherein the carrier is a mesostructured composition comprising boehmite or pseudoboehmite nanoplatelets and organic pillars, wherein the mesostructured composition exhibits at least one low angle x-ray diffraction line corresponding to a lattice spacing of at least 20 A, wherein the mesostructured composition is formed by reaction of a first surface modified boehmite or pseudoboehmite nanoplatelet composition with a second surface modified boehmite or pseudoboehmite nanoplatelet composition; and, wherein the first surface modified boehmite or pseudoboehmite nanoplatelet is surface-modified with a p-carboxy-aromatic-maleimide and the second surface modified boehmite or pseudoboehmite nanoplatelet is surface-modified with a-carboxy-Q-thiol and the two are mixed together in water at a pH exceeding 5 to form the mesostructured composition.

2. A corrosion detecting composition: comprising, a nanoparticle and at least one chemically reactive adsorbate associated with the nanoparticle; wherein the chemically reactive adsorbate displays a responsive surface enhanced Raman scattering (SERS) spectral response that is a function of RH: wherein the nanoparticle is contained in a selective carrier; wherein the selective carrier allows transport of protons or hydroxide anions to the at least one chemically reactive adsorbate associated with the nanoparticle; wherein the selective carrier restricts transport of organic chemical compounds to the at least one chemically reactive adsorbate; wherein the selective carrier prevents chemical reactions between the chemically reactive adsorbate and organic chemical compounds which contact the selective carrier; wherein the selective carrier is a mesostructured composition comprising boehmite or pseudoboehmite nanoplatelets and organic pillars, wherein the mesostructured composition exhibits at least one low angle x-ray diffraction line corresponding to a lattice spacing of at least 20 Å, wherein the mesostructured composition is formed by reaction of a first surface modified boehmite or pseudoboehmite nanoplatelet composition with a second surface modified boehmite or pseudoboehmite nanoplatelet composition; and, wherein the first surface modified boehmite or pseudoboehmite nanoplatelet is surface-modified with a p-carboxy-aromatic-maleimide and the second surface modified boehmite or pseudoboehmite nanoplatelet is surface-modified with a-carboxy-Q-thiol and the two are mixed together in water at a pH exceeding 5 to form the mesostructured composition.

3. The composition of claim 2, further comprising a latent reactive epoxy monomer or a latent reactive epoxy resin; wherein the carrier is dispersed in the latent reactive epoxy monomer or a latent reactive epoxy resin; and wherein the carrier prevents chemical reactions between the latent reactive epoxide monomer or latent reactive epoxide resin and the chemically reactive adsorbate.

4. The composition of claim 2, wherein the selective carrier restricts transport of organic chemical compounds, which are electrophiles, to the at least one adsorbate.

5. The composition of claim 4, wherein electrophiles are either epoxide monomers, epoxy resins, acrylate monomers, acrylate resins, methacrylate monomers, methacrylate resins, acrylamides, polyurethane monomers, polyurethane resins, polysiloxane monomers, and polysiloxane resins.

6. The composition of claim 2, wherein the nanoparticle comprises a coinage metal selected from the group consisting of gold, silver and copper.

7. The composition of claim 6, wherein the at least one adsorbate has a coinage metal attachment functional group and a pH sensitive functional group.

8. The composition of claim 7, wherein the at least one adsorbate is selected from the group consisting of 4-mercapto pyridine, 5-methylthio-1,3,4-thiadiazole-2-thiol, mercaptobenzimidazole, 2,5-dimercapto-1,3,4-thiadiazole and 6-mercaptopyridine-3-carboxylic acid.

9. The composition of claim 8, wherein the at least one adsorbate is 4-mercapto pyridine.

10. The composition of claim 7, wherein the at least one adsorbate is a protonatable organic compound.

11. The composition of claim 7, wherein the at least one adsorbate contains a coinage metal attachment functional group which is a thiol.

12. The composition of claim 7, wherein the at least one adsorbate comprises a protonatable organic functional group that displays a responsive surface enhanced Raman scattering (SERS) spectral response that is a function of pH over the range from pH 4 to pH 12.

13. The composition of claim 12, wherein the protonatable organic functional group is selected from the group consisting of pyridine, carboxylate, amine, and aromatic amine.

* * * * *